United States Patent [19]

Ishida et al.

[11] Patent Number: 4,766,302
[45] Date of Patent: Aug. 23, 1988

[54] FOCUS DETECTING DEVICE INCLUDING MEANS FOR DETERMINING A PRIORITY OF CORRELATION CALCULATIONS

[75] Inventors: Tokuji Ishida, Osaka; Katsumi Kozakai, Sakai; Masataka Hamada, Minami Kawachi, all of Japan

[73] Assignee: Minolta Camera Kabushiki Kaisha, Osaka, Japan

[21] Appl. No.: 735,569

[22] Filed: May 17, 1985

[30] Foreign Application Priority Data

| May 17, 1984 | [JP] | Japan | 59-100069 |
| May 22, 1984 | [JP] | Japan | 59-104212 |
| May 22, 1984 | [JP] | Japan | 59-104213 |

[51] Int. Cl.⁴ .................................. G02B 7/11
[52] U.S. Cl. ............................ 250/201; 250/204; 354/408
[58] Field of Search ............... 250/201 PF, 201 AF; 354/407, 406, 408, 404, 402; 356/1, 4

[56] References Cited

U.S. PATENT DOCUMENTS

| 4,184,968 | 1/1980 | Stauffer | 354/408 |
| 4,297,571 | 10/1981 | Utagawa et al. | 250/201 |
| 4,305,657 | 12/1981 | Masunaga et al. | 250/201 |
| 4,470,676 | 9/1984 | Kinoshita et al. | 250/201 |
| 4,523,829 | 6/1985 | Eguchi et al. | 354/406 |
| 4,529,287 | 7/1985 | Karasaki et al. | 250/201 |
| 4,561,749 | 12/1985 | Utagawa | 250/204 |
| 4,561,750 | 12/1985 | Matsumura | 354/406 |
| 4,573,784 | 3/1986 | Suzuki | 354/406 |
| 4,633,073 | 12/1986 | Horikawa | 250/201 |
| 4,636,624 | 1/1987 | Ishida et al. | 250/201 |
| 4,641,942 | 2/1987 | Sakai et al. | 354/406 |

FOREIGN PATENT DOCUMENTS 58-135411 8/1983 Japan .

*Primary Examiner*—David C. Nelms
*Assistant Examiner*—Charles Wieland

[57] ABSTRACT

In a focus detection system for detecting focus condition of an objective lens, there is disposed a pair of photo sensor arrays each having a plurality of photo cells lined up in one direction to receive a first image and second image passed through respectively a lens system and the photo sensor arrays produce first original signal groups and second original signal groups each signal groups corresponding to light intensity of the images projected thereto. A processing device processes the original signal groups in such a manner that the first original signal groups are respectively divided into a plurality of blocks, and one of the blocks of the first original signal groups is selected and it is detected that in what group in the selected block best coincidence occurs.

2 Claims, 18 Drawing Sheets

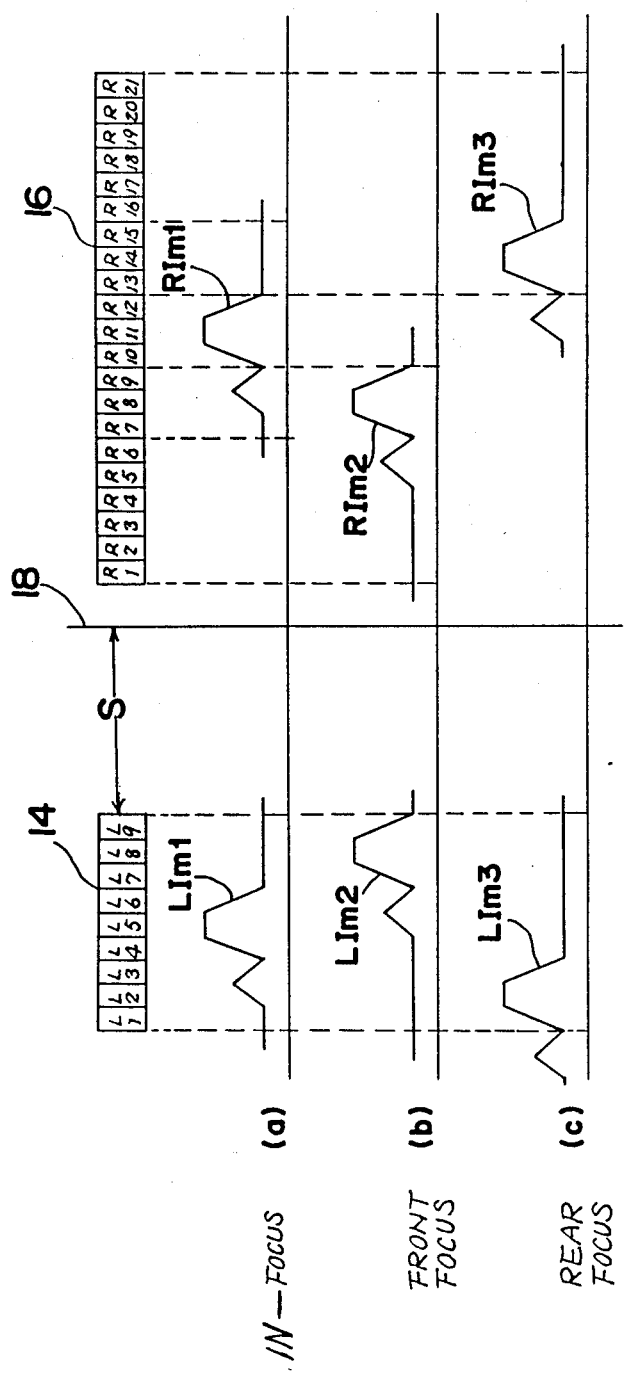

Fig. 9
(a) 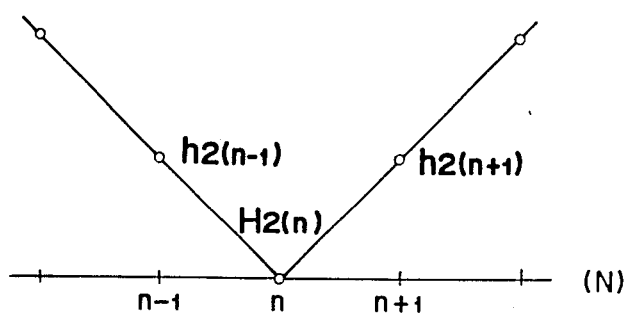
(b) 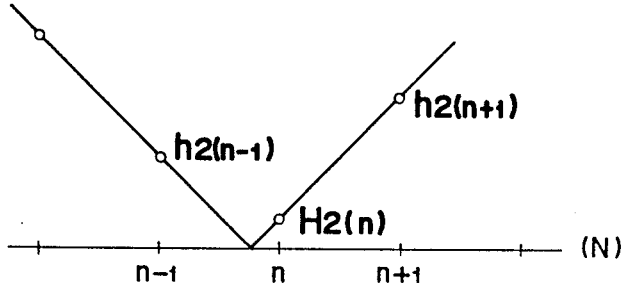
(c) 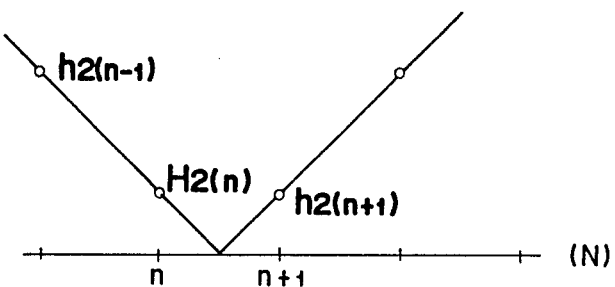
(d) 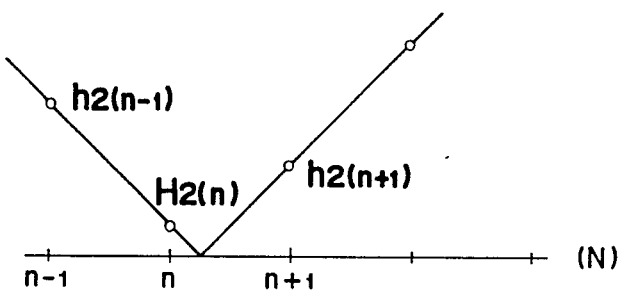

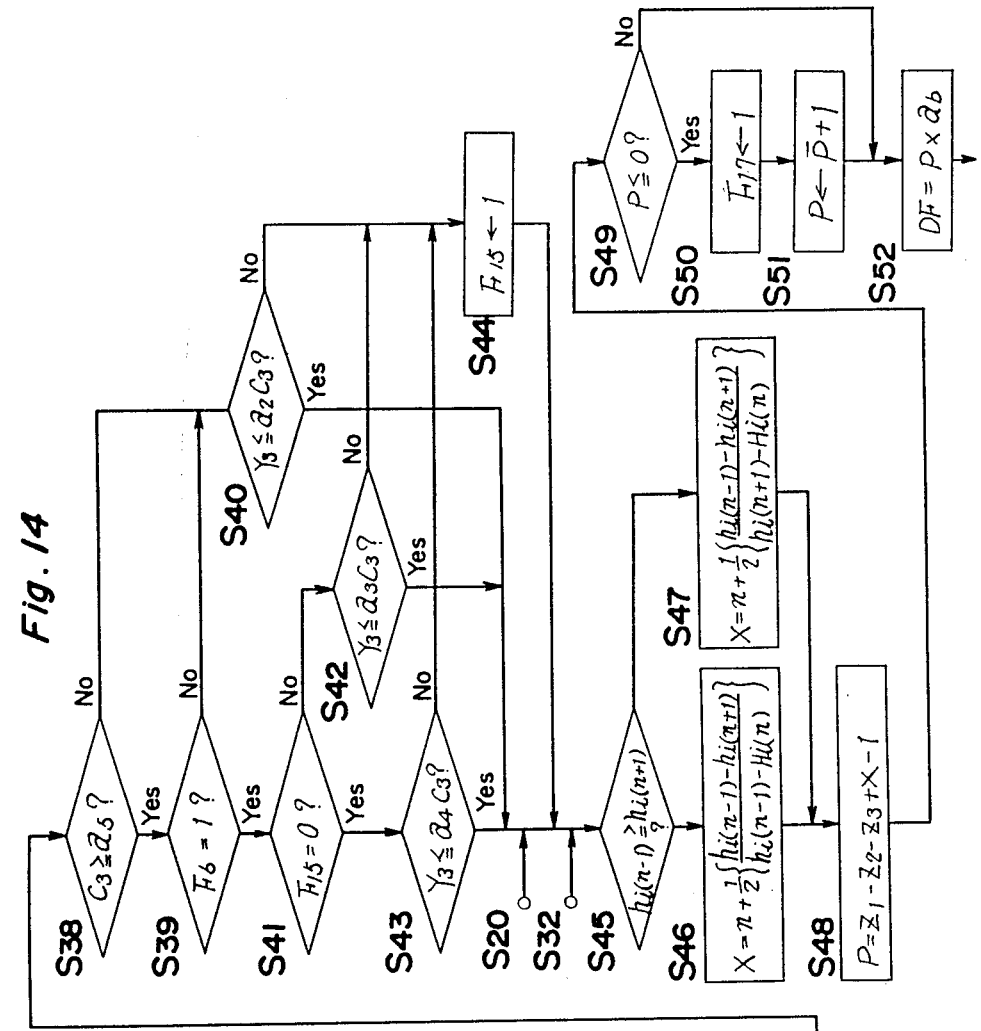
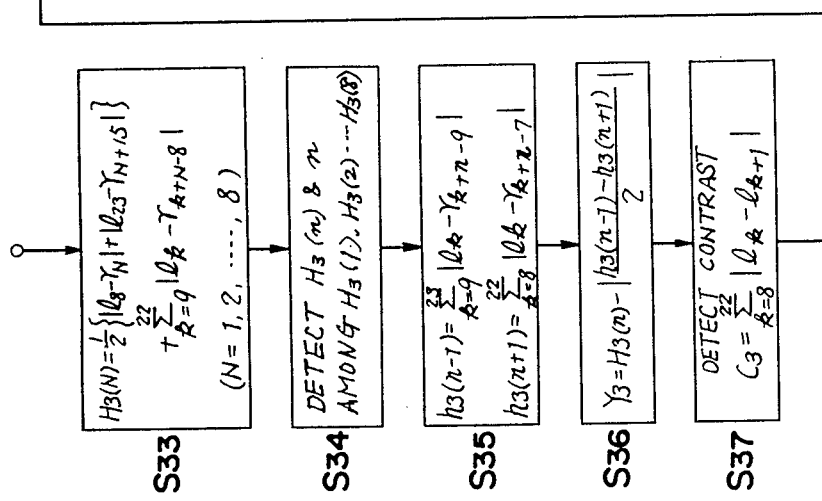
Fig. 14

Fig. 16
(a) 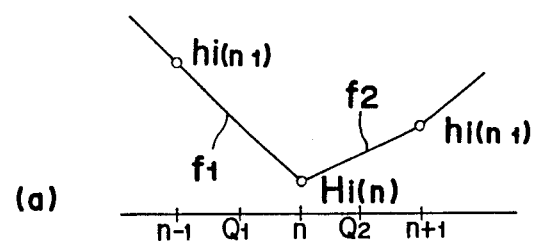
(b) 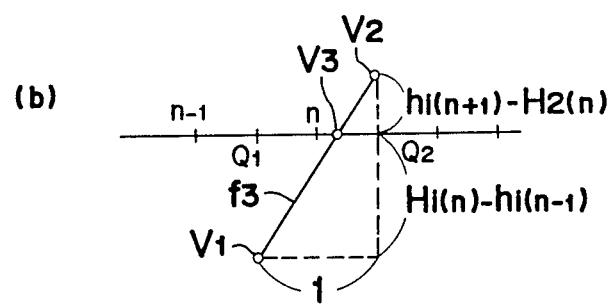

FOCUS DETECTING DEVICE INCLUDING MEANS FOR DETERMINING A PRIORITY OF CORRELATION CALCULATIONS

FIELD OF THE INVENTION

The present invention relates to a focus detecting device, and more particularly to a device for detecting a focused condition of a photographic lens system by way of detecting a relative displacement of images projected on a pair of photo sensor arrays.

BACKGROUND OF THE INVENTION

In order to detect the direction of defocus and the amount thereof, there is known such an arrangement that light of a photographic object is passed through a photographic lens to form two light images of the object, which are directed to two regions existing symmetrical with respect to the light axis of the lens, thereby reforming two light images on two planes, so that a displacement and a direction between the positions of the two focused light images from a predetermined focused position are detected for determining when the photographic lens is in the in-focus position, front focus position or rear focus position. FIGS. 1A and 1B show an example of the arrangement for the method described above, wherein behind the photographic lens 2, a condenser lens 4 is placed on the predetermined focal plane 4 or backward therefrom. Re-forming lenses 8 and 10 are placed behind the condenser lens 4 and first and second photo line sensor arrays 14 and 12 are disposed. By this arrangement, in the case of a front focus condition, light images projected on the photo sensor arrays 14 and 12 come near the optical axis and in case of a rear focus condition, the light images are displaced away from the optical axis. In case of an in-focus condition, the two light images are projected on predetermined positions defined by the optical system of the focus sensing device. Therefore, by detecting the distance between the two light images on the photo sensor arrays, the focused condition of the photographic lens can be detected.

In FIGS. 2(a) through 2(c), light image patterns projected on the first and second photo sensor arrays 14 and 16 are shown. The first photo sensor array 14 (referred to as the standard photo sensor array hereinafter) consists of photo cells L1 through L9 and the second photo sensor array 16 (referred to as the reference photo sensor array hereinafter) consists of photo cells R1 through R21 lined up in a horizontal direction with a predetermine space S on both sides of a center line 18. The center line 18 is determined so that the optical axis of the photographic lens 2 passes through it. Patterns of the light intensity of the images projected on the standard and reference photo sensor arrays 14 and 16 are designated by LIm and RIm. FIG. 2(a) shows that the image pattern RIm1 which coincides with the image pattern LIm1 projected on the standard photo sensor array 14 is positioned on photo cells R7 through R15 of a reference photo sensor array 16. It is assumed that FIG. 2(a) shows an in-focus condition. In case of FIG. 2(a), the output value of each photo cells L1 through L9 of the standard photo sensor array 14 is equal to the output value of each photo cells R7 through R15 of the reference photo sensor array 16 respectively. Therefore $L1-R7=0$, $L2-R8=0$, ... $L9-OR15=0$, wherein L1, L2, ... L9, R7, R8, ... R15 are output values of the respective photo cells L1 through L7 and R7 through R15. In addition, $|L1-R7|+|L2-R8|+ ... |L9-R15|=0$. As mentioned above, in a case where two images coincide with each other, the difference between the corresponding two photo cells is 0 and the sum of each difference is also 0. In practice, since the photo sensing characteristics of the respective photo cells are different from cell to cell, the result of the subtraction and the total sum can not be zero but can be a minimum if the degree of the coincidence between two images is highest.

In case of a front focus condition, as shown in FIG. 2(b), the image pattern RIm2 which is projected on the reference photo sensor array 16 and coincides with the image pattern LIm2 projected on the standard photo sensor 14 is projected on the photo cells R1 through R9. In case of a rear focus condition, as shown in FIG. 2(c), the image pattern RIm3 which is projected on the reference photo sensor array 16 and coincides with the image pattern LIm3 projected on the standard photo sensor 14 is projected on the photo cells R13 through R21. In order to detect the projected position of the image pattern RIm on the reference photo sensor array 16, the image pattern LIm on the photo cells L1 through L9 of the standard photo sensor array 14 is compared with the image pattern RIm on the photo cells R1 through R9 of the reference photo sensor array 12, thereafter the image pattern LIm on the photo cells L1 through L9 is compared with the image pattern on the photo cells R2 through R10. In a similar manner, the image pattern is taken from the respective photo cells of the reference photo sensor array 12 by shifting the measurement to the right by one photo cell, then the respective image patterns thus taken are compared with the image pattern LIm so that results of comparison of thirteen sets can be obtained. Defining H(1) as the result of the comparison in terms of the image pattern on the photo cells R1 through R9, the result can be expressed.

$$H(1) = |R1 - L1| + |R2 - L2| + \ldots + |R9 - L9|$$
$$= \sum_{k=1}^{9} |R_k - L_k|$$

In a similar manner, the result H(2) of the comparisons in terms of the photo cells R2 through R10 is expressed $$H(2) = |R2 - L1| + |R3 - L2| + \ldots |R10 - L9|$$
$$= \sum_{k=1}^{9} |R_{1+k} - L_k|.$$

By the calculation mentioned above, thirteen results of the comparisons H(i), wherein i=1, 2, ..., 13 (referred to as relative value hereinafter) can be obtained.

By finding the minimum relative value Hmin(n) among H(1) through H(13), the number n represents the result of the comparison wherein both image patterns LImn and RImn coincides best. For example, in case of FIG. 2(a), the minimum relative value occurs at the number n=7. In case of FIGS. 2(b) and 2(c), the minimum relative values occurs at the numbers n=1 and n=13. The amount of the displacement of FIGS. 2(b) and 2(c) against FIG. 2(a) is $-6(=1-7)$, $6(=13-7)$ on the pitch of the photo cells basis, then the amount of the displacement can be obtained.

By providing 9 photo cells of the standard photo sensor array 14 and 21 photo cells of the reference photo sensor array 12, the defocus condition can be detected in the range of a plus or minus 6 pitches. In order to expand the detectable range of defocus, it is possible to increase the number of the photo cells of the reference photo sensor array 12 against the number of the photo cells of the standard photo sensor array 14. In order to expand the detectable range of the defocus with the 21 photo cells of the reference photo sensor array, it is required to decrease the number of the photo cells of the standard photo sensor array 14. For example, detection of the defocus can be made with 7 pitchs by eliminating the photo cells L1 and L9. Decreasing the number of the photo cells, however, causes the accuracy of the defocus detection to be lowered.

In order to eliminate the disadvantage described above, U.S. patent application Ser. No. 570,012, now U.S. Pat. No. 4,636,624 discloses a method of detecting the defocus with a high accuracy as shown in FIG. 3. In FIG. 3, there are added four photo cells La, Lb, Lc and Ld to the standard photo sensor array 14 shown in FIG. 1. Using the output of 13 photo cells La through Ld in addition to the photo cells L1 through L9, the defocus can be detected within the range of +4 pitches of the photo cells. Compared with the arrangement of FIG. 2, the defocus detecting range of the arrangement shown in FIG. 3 is smaller by +2 pitches of the photo cells, thereby the accuracy of the comparison can be improved.

In order to detect the defocus condition with greater than 4 pitches of the photo cells, defocus as shown in FIG. 3(b) can be detected using seven photo cells L5 through Ld. FIG. 3(b) shows that the image pattern is displaced by 10 pitches of the photo cells relative to the in-focus condition shown in FIG. 3(a). In other word, by using the output of the photo cells L5 through Ld of the arrangement shown in FIG. 3, a front focus condition defocused by 10 pitches of the photo cells can be detected. To the contrary, using the output of the photo cells La through L5 enables the system to detect the rear focused condition defocused backwardly by 10 pitches. In the arrangement of FIG. 3, the accuracy of the defocus detection may be decreased due to decrement of the number of the photo cells. However, this may be negligible because in case of a large defocus, it is enough to detect a rough value of the defocus first, then the objective lens is moved to a position near the in-focus position on the basis of the detected defocus value, subsequently a fine focusing detection is made using the output of the photo cells La through Ld.

In the focus detection, at first, the position of the photographic lens is not preliminarily known, therefore one problem is to decide what photo cell outputs among the group I, II, III shown in FIG. 3 should be used at first as the standard. In the U.S. patent application Ser. No. 570,012, now U.S. Pat. No. 4,636,624 defocus detection is made first for all of the groups I, II and III, then the minimum relative value Lmin (n) is detected so as to select any one of the groups I, II, III in which the minimum relative value occurs. In the above method, the defocus detection for the groups I, II and III must be made even if the photographic lens is situated near the focused position, therefore such an operation is apparently unnecessary.

SUMMARY OF THE INVENTION

The present invention is to provide a defocus sensing device without any unnecessary operation and arrangement.

According to the present invention there is provided a focus detection system for detecting a focus condition of an objective lens, comprising;

optical means for receiving objective light having passed through said objective lens at two positions distant from the optical axis of the objective lens, to form first and second object images in such a manner that the distance between said first and second object images in a direction perpendicular to the optical axis varies with the focus condition of an object image by said objective lens on a predetermined focal plane, means, including a pair of photo sensor arrays each having a plurality of photo cells lined up in one direction and disposed to receive the first image and second image respectively for producing first original signal groups and second original signal groups each signal groups corresponding to the light intensity of the images projected thereto, means for dividing the first original signal groups into a plurality of blocks, means for selecting one of the blocks of the first original signal groups which has the closest coincidence with a predetermined group of the second original signal group, when the objective lens is in in-focus condition, and for comparing the second original signal groups of the predetermined group with the signal group in the selected block of the first original signal group by shifting the photo cells in a predetermined direction, and means for detecting in which group of the selected block that the best coincidence occurs.

BRIEF DESCRIPTION OF THE DRAWINGS

FIGS. 2(a) through 2(c) and FIGS. 3(a) through 3(c) are schematic diagrams showing the principle of the operation of the device shown in FIG. 1A, FIGS. 4(a) and 4(b) are enlarged front views of photo sensor arrays used in the embodiment of the present invention, FIGS. 6, 12 and 14 are flow charts showing operation of the circuit arrangements shown in FIGS. 5(a), 5(b), 11, 13 and 15, FIGS. 9(a) through 9(d) are graphs showing various relations of the shift value and co-relation value, FIGS. 16(a) and 16(b) are schematic diagrams showing one way of obtaining the minimum interplation shift value.

DETAILED DESCRIPTION OF PREFERRED EMBODIMENTS

Figure 1A:
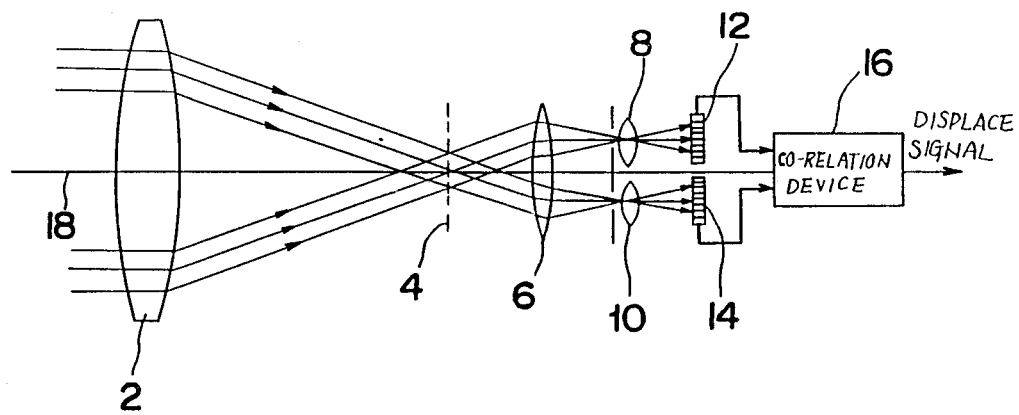
FIGS. 1B and 1A are schematic diagram showing an example of a focus detecting device used in the present invention.
Figure 1B:
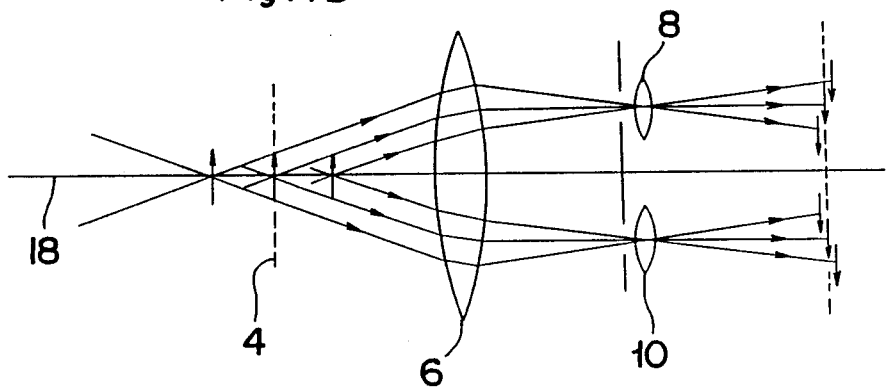
Figure 3:
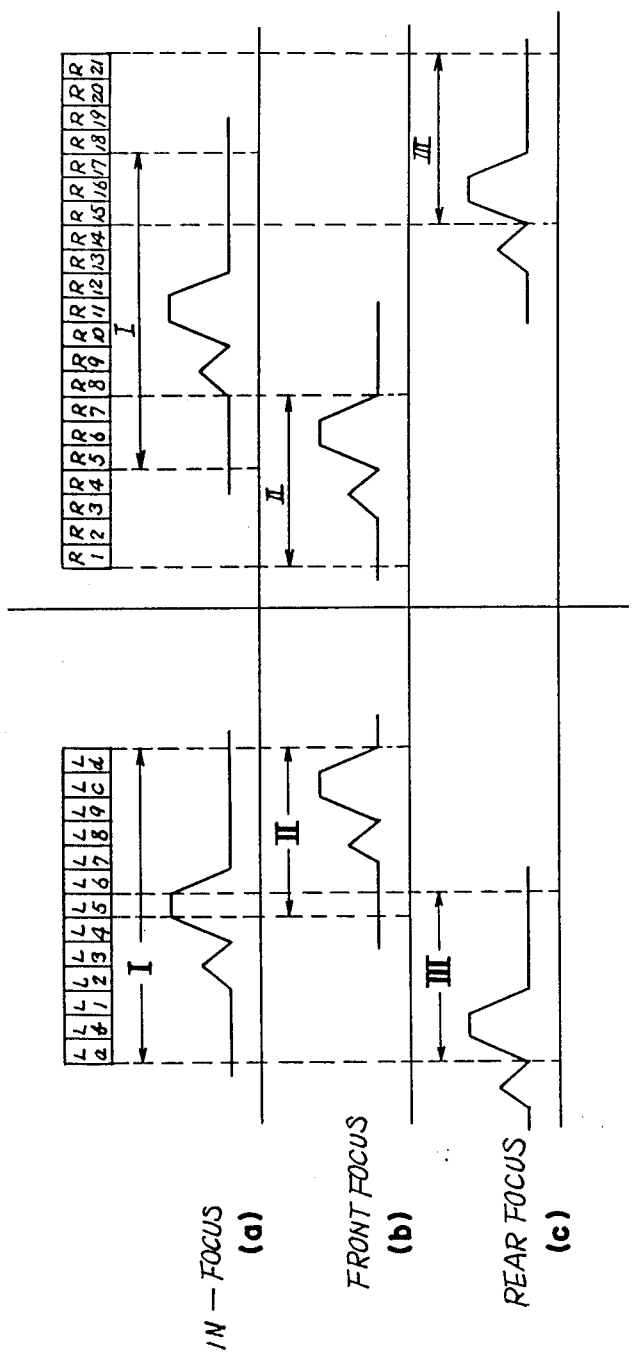
Figure 4A:
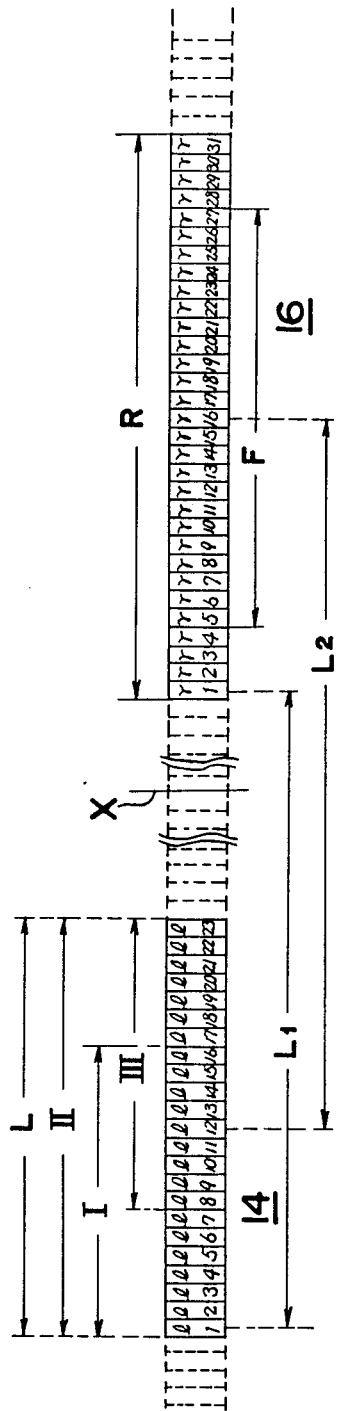
Figure 4B:
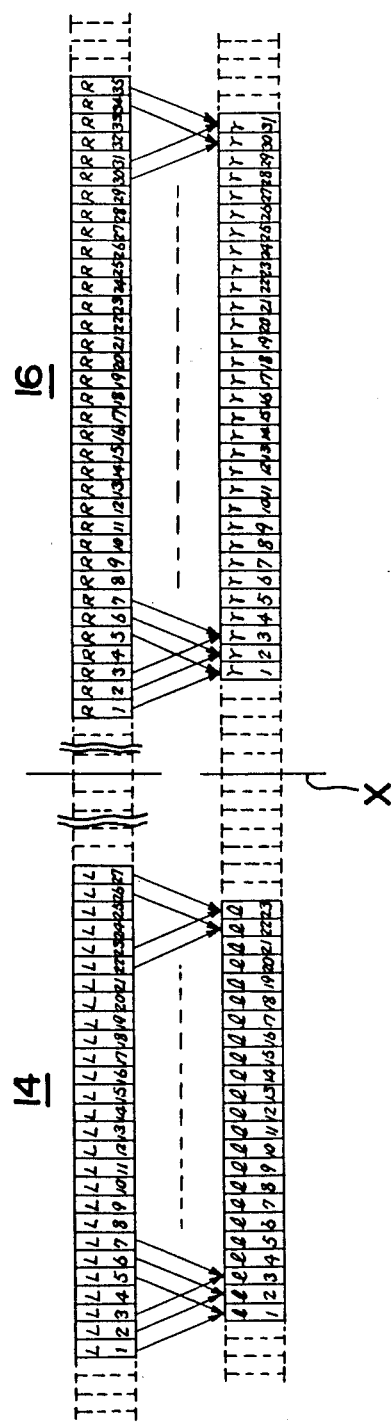

Referring to FIG. 4(a), in place of using two photo sensor arrays 14 and 16 in the arrangement shown in FIGS. 1 and 2, one photo sensor array such as a CCD line image sensor array is used by assigning two different portions of the CCD line image sensor array to the standard and reference photo sensor arrays 14 and 16. In FIG. 4(a), X denotes the position through which the optical axis of the photographic lens passes. It is noted that photo cells near the position X are not used. l1 through l23 denote photo cells of the standard photo sensor array 14. The standard photo sensor array 14 is divided into a first block I consisting of the cells l1 through l16, a second block II consisting of the cells l1 through l23 and a third block III consisting of the cells l8 through l23. The first and third blocks I and III have 16 photo cells and the second block II has 23 photo cells. A light receiving element (not shown) is disposed above the standard photo sensor array 14 for monitoring the intensity of light projected thereto. Elements r1 through r31 are photo cells of the reference photo sensor array 16 having 31 photo cells which is greater than the number of the photo cells of the standard photo sensor array 14. L1 is a distance between the photo cell l1 of the standard situated furthest from the optical axis X and the photo cell r1 of the reference photo sensor array 16 nearest to the optical axis X. When the photographic lens exists at the in-focus position in the predetermined focus plane, the image projected to the photo cells l1 through l23 of the block II of the standard photo sensor array 14 coincide with the image projected to the photo cells r5 through r27 of the reference photo sensor array 16. The block consisting of the photo cells r5 through r27 is referred to as in-focus block F. Distance between the photo cell l12 situated at the center of the second block II of the standard photo sensor array 14 and the photo cell r16 situated at the center of the in-focus block F of the reference photo sensor array 16 is referred to as an image distance L2 when the in-focus condition is detected.

Figure 5B:
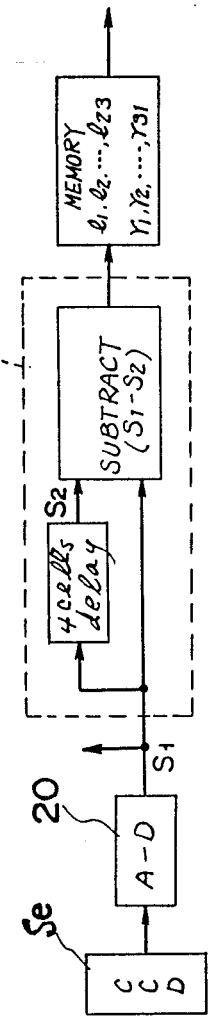
FIGS. 5(a), 5(b), 11, 13 and 15 are respectively circuit diagrams showing one embodiment of the focus detecting device according to the present invention.
Figure 5A:
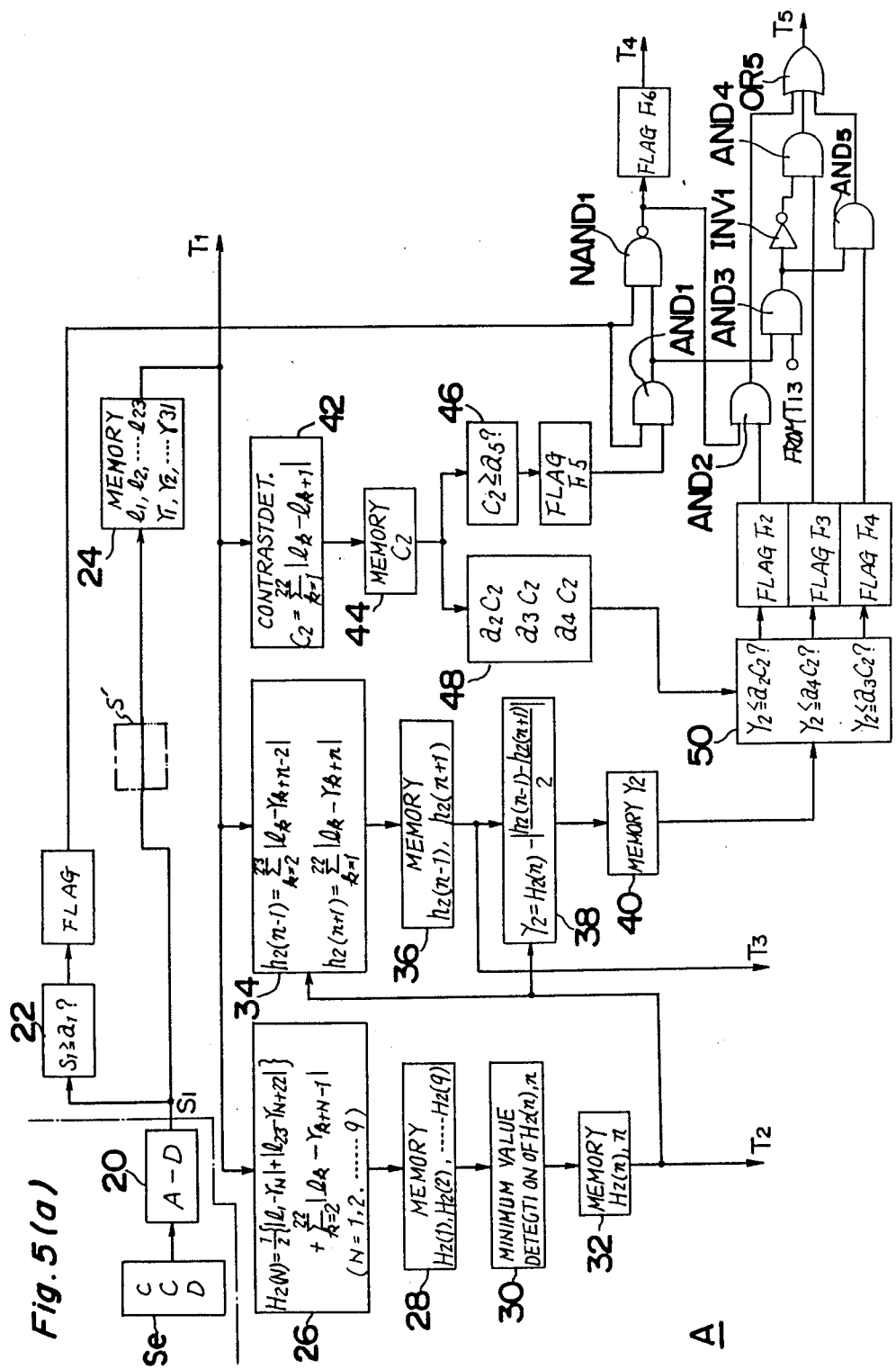
Figure 6:
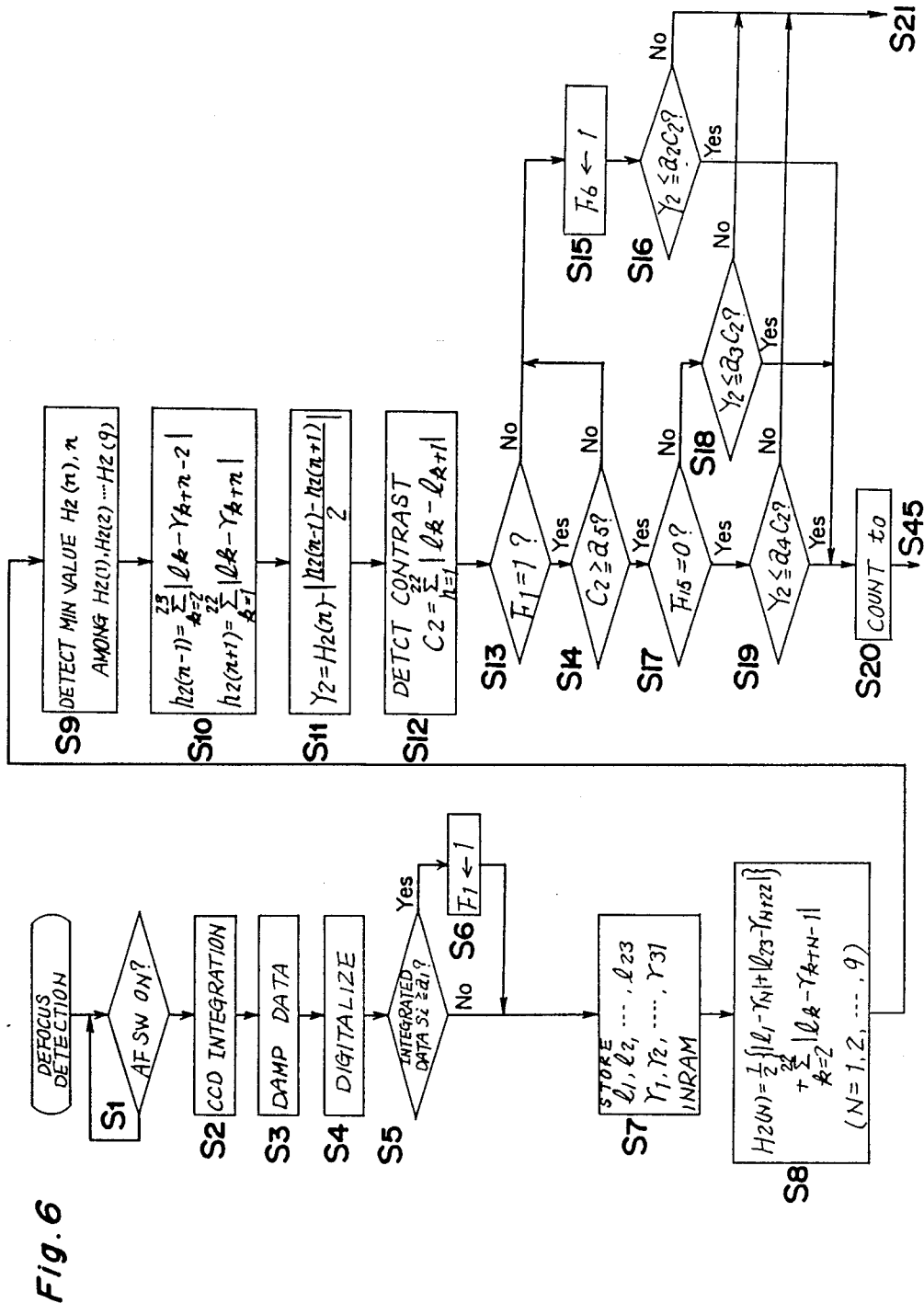

FIG. 5(a) shows one example of a control circuit used in the preferred embodiment of the focus sensing device according to the present invention, in particular there is shown mainly a circuit arrangement A for processing the output data from the sensor arrays 14 and 16 so as to detect the relation between the output data of the second block II of the standard photo sensor array 14 and the output data of the reference photo sensor array 16. Both of the photo sensor arrays 14 and 16 are expressed by Se in FIG. 5(a) and the integrated output data of each photo cells is converted into data in a digital form. An operation thereof is shown in FIG. 6. Upon detection of the closure of an AF (auto focus operation) switch (at the step S1 of FIG. 6), current flowing from each of the photo cells of the photo sensor arrays Se is integrated in the step S2 and in turn the integrated current is damped in the step S3, subsequently in the step S4, the damped analog data of the respective photo cells are sequentially converted into digital form by the A-D converter 20. The integrated data Si of each of the photo cells l1 through l23 and r1 through r31 is sequentially compared with a predetermined standard value a1 (at the step S5) by a comparator 22 for detecting whether or not the integrated data Si is larger or smaller than the predetermined value a1. If any one of the integrated data Si is greater than the standard value a1, a flag F1 is set to 1 in the step S6. In the case where all of the integrated data Si is smaller than the standard value a1, the flag F1 is kept reset to 0. The comparator 22 and the flag F1 act as a brightness detecting means for detecting whether or not the brightness level of an photographic object exceeds the predetermined value, whereby in a case where the output of any one of the photo cells l1 through l23 or r1 through r31 exceeds the standard value a1, the flag F1 is set for judgement that there is a sufficient brightness of the object for the focus detection.

In the step S7, the integrated data Si of the respective photo cells l1 through l23 and r1 through r31 are stored in a memory device 24 such as a RAM so that the respective integrated data of the photo cells l1 through l23 and r1 through r31 are stored in the corresponding address of the RAM 24. It is noted that l1 through l23 and r1 and r31 represent the output value of each of the photo cells l1 through l23 and r1 and r31. A calculation circuit 26 calculates the following equation;

$$H_2(N) = \tfrac{1}{2}\left( |l1 - r_N| + |l23 - r_{N+22}| + \sum_{k=2}^{22} |l_k - r_{k+N-1}| \right) \quad (1)$$

wherein the suffix 2 in $H_2$ means that the second block II of the standard photo sensor array 14 is used, N is 1, 2, ... 9.

When N=1 the equation (1) is expressed $$H_2(1) = \tfrac{1}{2}|l1 - r1| + |l2 - r2| + \ldots + |l22 - r22| + \tfrac{1}{2}|l23 - r\leq| \quad (2)$$

Namely, the equation (2) calculates the absolute value of the difference of the output of the photo cells l1 and r1, to the absolute value of the difference of the output of the photo cells l23 and r23 and with the outputs of both ends of the photo cells divided by 2, it can then calculate the total value.

When N=2, the equation (1) is expressed $$H_2(2) = \tfrac{1}{2}|l1 - r2| + |l2 - r3| + \ldots + |l22 - r23| + \tfrac{1}{2}|l23 - r24| \quad (3)$$

Namely, the equation (3) represents to calculate the absolute value of the difference of the output of the photo cells, shifting the respective cells l1 through l23 of the second block II relative to the reference photo sensor array 16 by one cell compared to the case of $H_2(1)$, thereby calculating the relative value between corresponding two photo cells such as l1 and r2, l2 and r3 ... , then the total sum is calculated with the both ends divided by 2. Similarly for the N=3, 4, 5 ... , 9, shifting the respective cells l1 through l23 of the second block II relative to the reference photo sensor array 16 by 2, 3, ... 8 cells compared to the case of $H_2(1)$ thereby calculating the relative value between corresponding two photo cells such as l1 and r3, l2 and r4 ... , then the total sum is calculated with the both ends divided by 2. It is noted that $H_2(N)$ is referred to as a comparative data and N shift value. By the calculation mentioned above, there can be obtained nine kinds of the comparative data by changing the shift value from 0 (corresponds to N=1) to 8 (corresponding to N=9). The comparative data becomes 0 when the light image patterns projected to the respective photo sensor arrays 14 and 16 are exactly the same. The larger the displacement of the light image patterns results in the comparative data becoming larger.

Division by 2 of the absolute value of the difference of the data of the both end photo cells decreases the contribution of the value of the both end photo cells to the comparative data $H_2(N)$ as hereinafter explained.

The comparative data $H_2(N)$ is stored in the RAM 28 with the shift value N. The minimum value among the 9 comparative data $H_2(N)$ can be detected by a minimum value detector 30.

The minimum comparative data is expressed as $H_2(n)$ and the shift value by which the minimum comparative data occurs is expressed as a minimum shift value n. (n is any one of 1, 2, 3, ... 9). The minimum comparative data $H_2(n)$ and the minumum shift value n are respectively stored in the RAM 32.

A calculation circuit 34 calculates the following equations;

$$h_2(n-1) = \sum_{k=2}^{23} |l_k - r_{k+n-2}| \quad (4)$$

$$h_2(n+1) = \sum_{k=1}^{22} |l_k - r_{k+n}| \quad (5)$$

on the basis of the integrated data l1, l2 ... l23 and r1, r2 ... r31, the minimum comparative data $H_2(n)$ and the minimum shift value n stored in the RAM 32.

Figure 7:
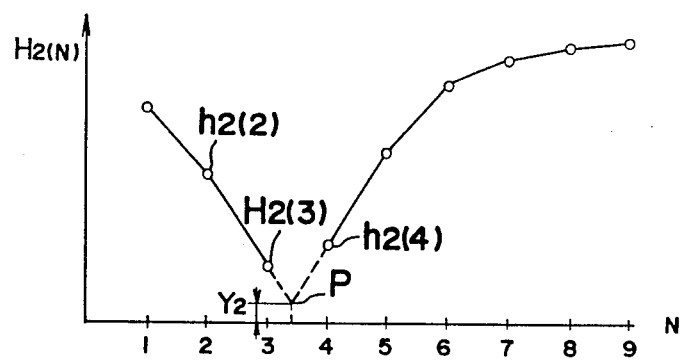
FIG. 7 shows a graph showing a principle of using a minimum interpolation shift value.

The calculation mentioned above is to increase the accuracy of the detection of the interval of the image. Assuming, for example, that the shift value N and the comparative data $H_2(N)$ have the relation as shown in FIG. 7. In this case, the minimum comparative data $H_2(n)$ is $H_2(3)$ with the minimum shift value n. However, in practice, the comparative data $H_2(N)$ may be changed along the dotted line. Under such situation, there occurs an error when the image interval is detected using n=3. That is to say, if the minimum shift value n is directly used for the image interval detection, the detection can be made in a cell to cell space basis, therefore accuracy finer than the cell space can not be obtained. The finer accuracy can be expected if the space of the cells is decreased. However this method is not practical because there is a limit in decreasing the space of the cell of the CCD sensor array in manufacturing thereof. In order to solve this problem, the preferred embodiment of the present invention is so arranged as to detect a further minimum comparative value smaller than the minimum value $H_2(n)$ in a position between n and n+1 so that the image interval can be detected with a finer accuracy.

Assuming that the comparative data $H_2(N)$ becomes minimum when N=3, i.e., the minimum comparative data is $H_2(3)$ with n=3. According to the equation (1), $H_2(3)$ is expressed as follows, $$H_2(3) = \tfrac{1}{2}|l1-r3| + |l2-r4| + |l3-r5| + \ldots \\ |l22-r24| + \tfrac{1}{2}|l23-r25| \quad (6)$$

On the other hand, by the equation (4), $$h_2(2) = |l2-r3| + |l3-r4| + \ldots + |l23-r24| \quad (7)$$

can be obtained. Also by the equation (5), $$h_2(4) = |l1-r4| + |l2-r5| + \ldots + |l22-r25| \quad (8)$$

can be obtained.

Comparing each term of the equation (6) with each corresponding term of the equations (7) and (8) with both end terms of the equation (6) neglected, it can be found that there can be obtained one comparison data $h_2(2)$ for the shift value n−1 (n=2) and another comparison data $h_2(4)$ for the shift value n+1 (n=4). It is noted that in place of dividing both end terms by 2, equations (7) and (8) are calculated with the one term omitted.

Accordingly, the scale of the result of $h_2(3)$ is equal to the scale of $h_2(2)$ and $h_2(4)$. so that it is possible to compare the value $h_2(2)$ with $h_2(4)$ without modifying by a factor.

Figure 8:
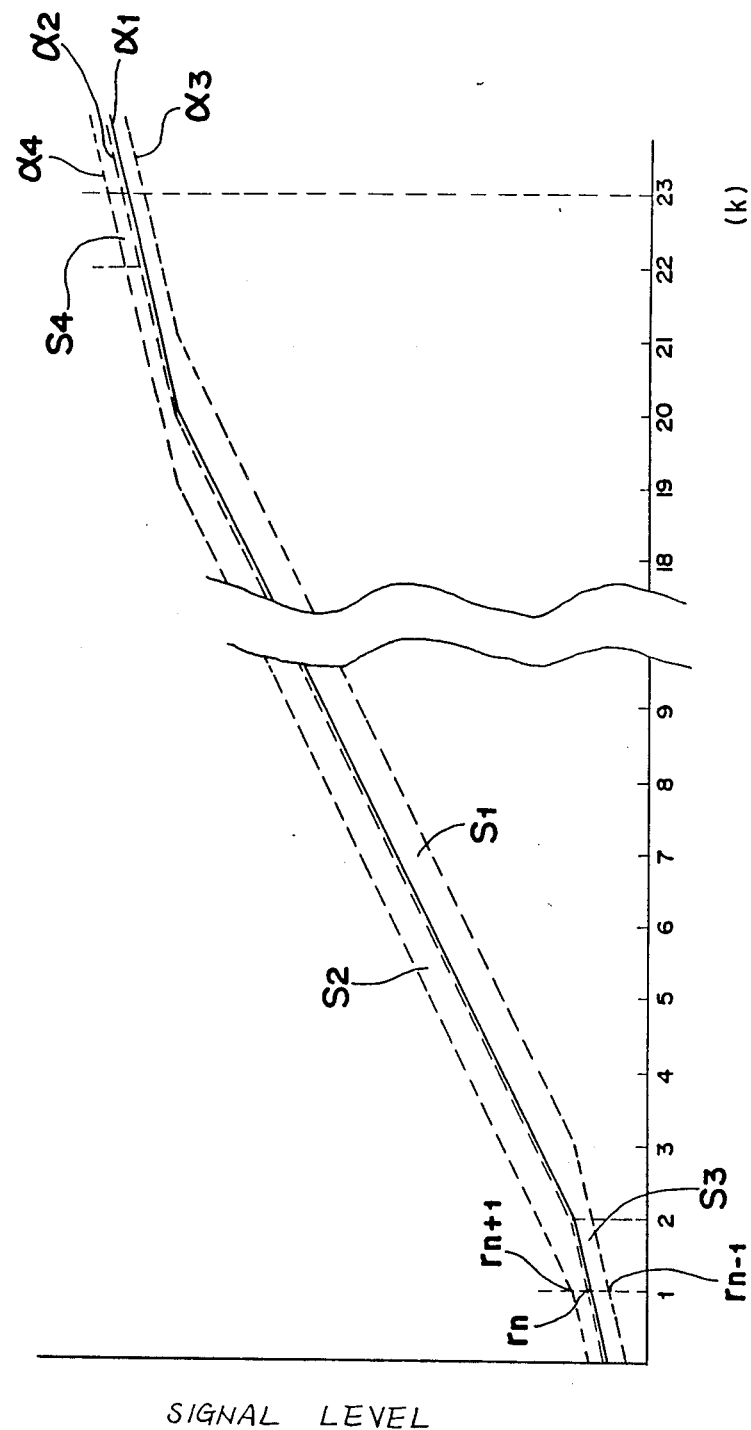
FIG. 8 is a graph showing an example of output of the photo sensor array.

Following is an explanation of a reason for obtaining the comparison data smaller than $H_2(3)$ using $h_2(n-1)$ and $h_2(n+1)$ with reference to FIG. 8.

In FIG. 8, the horizontal axis represents the number k of the photo cells and the vertical axis the output thereof. The line α1 represents the output of the photo cells l1 through l23, α2 denotes outputs of the photo cells rt through rt+22 which receive the light image having the highest relative value, wherein t=1, 2, ... 9.

On the other hand, the line α3 represents the outputs of the photo cells rt−1 through rt−1+22. Assuming the the relative value between the image on the photo cells l1 through l23 and the photo cells r5 through r27 is the highest, then t=5 and the dotted line α2 represents the outputs of the photo cells r5 through r27.

The co-relation degree I(1) between the photo cells l1 through l23 and r1 through r23 can be expressed $$I(1) = |l1 - r1| + |l2 - r2| + \ldots + \quad (9)$$

$$|l23 - r23| = \sum_{k=1}^{23} |l_k - r_k|.$$

The co-relation degree I(2) in which the outputs of the reference photo sensor array is displaced by one cell can be expressed $$I(2) = \sum_{k=1}^{23} |l_k - r_{k+1}|. \quad (10)$$

In a similar manner as described above, the co-relation degree values I(3) through I(9) can be obtained.

The highest co-relation degree I(5) can be expressed by the area surrounded by the lines α1 and α2 in the interval between k=1 through k=23.

The co-relation I(4) can be expressed as $$I(4) = \sum_{k=1}^{23} |l_k - r_{k+3}| \quad (11)$$

and can be depicted by the area surrounded by the lines α1 and α3 in the interval between k=1 through k=23.

The co-relation I(6) can be expressed as $$I(6) = \sum_{k=1}^{23} |l_k - r_{k+5}| \quad (12)$$

and can be depicted by the area surrounded by the lines α1 and α4 in the interval between k=1 through k=23.

As apparent from the gragh shown in FIG. 8, the area S1 is not equal to the area S2. It is noted that the areas S1 and S2 may be equal to each other if the lines α1, α2, α3 and α4 are linear. However, in practice there may not occur such a case that an image becomes linear.

The reason why the area S1 is not equal to the area S2 is because the co-relation between the reference photo sensor array is not equal to the interval k=1 through k=3 and k=21 through k=23 in terms of I(9) and I(10).

Taking both of the area S1 eliminating the area S3 which is the area surrounded by the lines α1 and α3 within the interval k=1 through k=2 and S2 eliminating the area S4 surrounded by the lines α1 and α4 within the interval k=22 and k=23, it is understood from the graphs shown in FIG. 8 that the following equation $$S1-S3=S2-S4 \tag{13}$$

can be established.

The value S1−S3 and S2−S4 can be expressed by the following equation.

$$S1 - S3 = \sum_{k=2}^{23} |l_k - r_{k+3}| \tag{14}$$

$$S2 - S4 = \sum_{k=1}^{22} |l_k - r_{k+5}| \tag{15}$$

When the line d1 and d2 overlaps, the equation (13) can be established, but if not overlapped, the equation (13) can not be established. If the lines α1 and α2 do not overlap, there is a smaller degree of inconsistency between the values of the equations (14) and (15) than the degree of inconsistency of the values of the equations (4) and (5). In other words, the former case has a better consistency.

If it can be expected that when an image projected on one block of the standard photo sensor array is compared with the image of the reference photo sensor array and the co-relation degree becomes highest at a given number of comparison, there occurs a good consistency of the result of the comparison by displacing one photo cell, it is preferred to use the result of the equations (14) and (15) rather than the result of the equation (11) and (12).

By the result of the study as described above, according to the present invention, the result of the calculation of the equations (14) and (15) in the final process of detecting the focused position the result of the comparison in terms of the forward or rearward of one pitch of the photo cell for the highest co-relation.

Assuming that there can be obtained the minimum comparison data H2(n) at the minimum shift value, the results of the comparison h2(n−1) and h2(n+1) at the n−1 number and n+1 number can be expressed $$h_2(n - 1) = |l_2 - r_n| + |l_3 - r_{n+1}| + \ldots + |l_{23} - r_{n+21}| \tag{16}$$

$$= \sum_{k=2}^{23} |l_k - r_{k+n-2}|$$

$$h_2(n + 1) = |l_1 - r_{n+1}| + |l_2 - r_{n+2}| + \ldots + |l_{22} - r_{n+22}| \tag{17}$$

$$= \sum_{k=1}^{22} |l_k - r_{k+n}|.$$

Both of the results of the equations (16) and (17) are used as the information for deciding the focused position.

Studying the equations (9) and (10), the left item of the equations consists of 23 terms. On the other hand, the left item of the equations (16) and (17) consists of 22 terms. There is a difference of one term between the number of the terms of the equations (9) and (16) or (10) and (17).

The equation (9) is shown again $$I(1) = |l_1 - r_1| + |l_2 - r_2| + \ldots |l_{23} - r_{23}| \tag{9}$$

Adopting the following equation $$I(1)' = \tfrac{1}{2}|l_1 - r_1| + |l_2 - r_2| + \ldots + |l_{15} - r_{15}| + \tfrac{1}{2}|l_{23} - r_{23}| \tag{18}$$

wherein the weight of the both ends of the equation is decreased by ½, the weight of the sum of the first term and the last term becomes 1, so that it can be dealt that there are 22 terms of the weight of 1. Therefore, the equation (18) can be used for obtaining the result of the comparison for the best coincidence in place of the equation (9).

The following equations can be calculated as to the first block, second block and third block respectively.

$$H_1(n) = \tfrac{1}{2}|l_1 - r_{N+8}| + |l_{16} - r_{N+23}| + \sum_{k=2}^{15} |l_k - r_{k+N+7}| \tag{19}$$

wherein N=1, 2, ... 8

$$H_2(n) = \tfrac{1}{2}|l_1 - r_N| + |l_{23} - r_{N+22}| + \sum_{k=2}^{22} |l_k - r_{k+N+1}| \tag{20}$$

wherein N=1, 2, ... 9

$$H_3(n) = \tfrac{1}{2}|l_8 - r_N| + |l_{23} - r_{k+N+15}| + \sum_{k=9}^{22} |l_k - r_{k+N+8}| \tag{21}$$

wherein N=1, 2, ... 9

There is a relationship between the result of the H2(n) obtained by the equations (4) and (5) and h2(n−1) and h2(n+1) wherein h2(n−1)≧H2(n) and h2(n+1)≧H2(n). These relations are depicted in FIG. 9, wherein the horizontal axis represents the shift value and the vertical axis the values of the equations H2(n), h2(n−1) and h2(n+1). FIG. 9(a) shows the case of h2(n−1)=h2(n+1), in this case the value H2(n) is at a minimum. FIG. 9(b) shows the case where h2(n−1) is smaller than h2(n+1), in this case, there is a true co-relation value data between n and n−1. FIG. 9(c) shows the case where h2(n−1) is greater than H2(n) which is equal to h2(n+1), in this case the true co-relation value is present between n and n+1. FIG. 9(d) shows the case where h2(n−1) is greater than h2(n+1), wherein the true co-relation value is present between n and n+1. It is noted that FIGS. 9(a) through 9(d) show the ideal cases with the true co-relation value to be 0. However in practice, the true co-relation value is not 0 due to such factor as lens aberration. In the case where two minimum values of the comparison data are detected as shown in FIG. 9c, the comparison data for the smaller n is used. Accordingly there is not a case of H2(n)=h2(n−1).

Returning to FIG. 5(a) again, the data h₂(n−1) and h₂(n+1) calculated in the calculation circuit 34 are transferred to memory circuit 36 and stored therein. The minimum comparison data H₂(n) stored in the memory circuit 32 and h₂(n+1) and h₂(n−1) stored in the memory circuit 36 are input to the calculation circuit 38 for calculation of the following equation (22) in the step S11 shown in FIG. 6.

$$Y_2 = H_2(n) - \tfrac{1}{2}|h_2(n-1) - h_2(n+1)| \tag{22}$$

The equation above obtains the value Y2 in FIG. 7 of the comparison data H₂(N) as the minimum peak value. The value Y2 is referred to as the minimum peak. The suffix 2 represents that the detection is made in the second block II.

Figure 10:
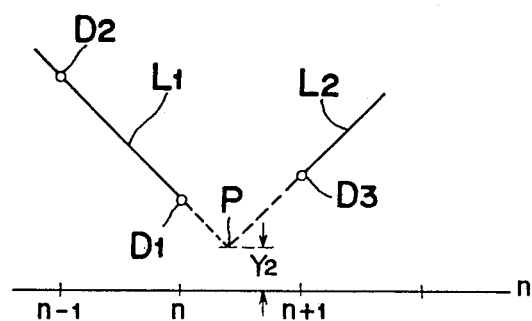
FIG. 10 is a schematic diagram showing one example of a way of obtaining the minimum shift value Y2 by an interpolation method.

A method of obtaining the minimum peak Y2 is explained with reference to FIG. 10. Taking the horizontal axis for the shift value and the vertical axis for the comparison data, the coordinates of the point D1 corresponding to the minimum comparison data can be shown by (n, H₂(n)), the coordinates of the point D2 corresponding to h₂(n−1) shows (n−1, h₂(n−1)) and the point D3 corresponding to h₂(n+1) shows (n+1, h₂(n+1)). The straight line L1 connecting the points D1 and D2 can be expressed using the coordinates of the both points and it is assumed that the peak P is situated on the straight line L1. It is further assumed that the straight line L2 connecting the points P and D2 has a gradient with the reversed sign against the line L1. Then the minimum peak P can be obtained by the coordinate of the point at which the lines L1 and L2 intersect together.

The minimum peak value Y2 thus obtained is stored in the memory circuit 40. The minimum peak value Y2 can be used for judgement of whether or not the minimum comparison data H₂(n) using the second block II is reliable.

In the preferred embodiment of the present invention, there is provided a contrast detecting circuit 42 for detecting the contrast of the light images on the block II in order to judge if the minimum comparison data H2(n) detected using the block II is reliable. The contrast detecting circuit 42 calculates the sum of the difference value of the output of each adjacent two photo cells in the block II as the contrast data C2 by the following equation;

$$C_2 = \sum_{k=1}^{22} |l_k - l_{k+1}| \tag{23}$$

The suffix 2 represents the value concerning the block II. The contrast value C2 is stored in the memory circuit 44. The contrast value stored in the memory circuit 44 is used for judging whether the contrast of the object is sufficient for the focus detection. In the case where the contrast is too low, despite the fact that the light image projected on the photo cells on the second group II of the standard photo sensor array 14 does not coincide with the light means projected on the reference photo sensor array 16, there could erroneously be obtained the minimum peak Y2 and the image interval would be erroneously detected.

In order to eliminate this drawback, the contrast value C2 detected by the contrast detecting circuit 44 is applied to a comparator 46 for judging whether or not the contrast value C2 is greater than a predetermined constant a5 in the step S14 shown in FIG. 6. The constant a5 is so selected that the contrast value C2 is greater than the constant a5 when the image of the photographic object has a sufficient contrast for the focus detection. In the case where the contrast value C2 is greater than the constant a5 i.e., the contrast is sufficient to detect the focused condition, a flag F5 is set to produce an output 1 by the output of the comparator 46. To the contrary with the contrast value smaller than the constant a5, i.e., the contrast is insufficient for the focus detection, the flag F5 is made 0.

The contrast value C2 stored in the memory circuit 44 is input to a calculation circuit 48, in which the contrast value C2 is multiplied with constants a2, a3 and a4 to obtain the values a2C2, a3C2 and a4C2 and they are stored in the memory circuit respectively. The constants a2, a3 and a4 are provided for setting a plurality of the judging levels so as to make sure the comparison data H₂(n) is reliable with reference to the various conditions. The values a2, a3 and a4 has the relation of a2<a3<a4. The values a2, a3 and a4 are respectively referred to as a first judge level, a second judge level and a third judge level in that order.

The judge levels a2C2, a3C2 and a4C2 are respectively input to the comparator 50 so as to be compared with the magnitude of the minimum peak Y2. In a case where the minimum peak Y2 is smaller than the first judge level a2C2, a flag F2 is set to 1 by the output of the comparator 50. In a case where the minimum peak Y2 is smaller than the second judge level a3C2, a flag F3 is set to 1 by the output of the comparator 50. In a case where the minimum peak Y2 is smaller than the third judge level a4C2, a flag F4 is set to 1 by the output of the comparator 50.

Since a2<a3<a4, when Y2 is equal to or smaller than a2C2, three flags F2, F3 and F4 are set. With a2C2≦Y2≦a3C2, the flags F2 and F3 are set. With a3C2>Y2≦a4C2, the flag F4 alone is set. With a4C2<Y2, none of the flags F2, F3 and F4 is set. Through this operation, it is judged that the minimum peak is smaller than the judge levels.

A logic circuit shown in the right lower portion of FIG. 5(a) is provided for judging if the minimum peak is reliable according to a first condition of whether the brightness of the photographic object is suitable for the focus detection by judging whether of not the flag F1 is set, a second condition of whether the contrast of the photographic object is suitable by judging whether or not the flag F5 is set and a third condition of whether or not the previous focus detection in the nearest past was made correctly by judging whether or not a flag F15 (described hereinafter) is set.

Referring to FIG. 6, in the steps S13 and S14, it is judged whether or not the flag F1 is set and the flag F5 is set. In a case where any one of the flags F1 and F5 is not set, the program flow goes to the step S15 to set the flag F6. This is made in such a manner that if any one of the output of the flags F1 or F5 is "0", the output of an and gate AND1 is "0" and the output of a nand gage NAND 1 is "1" whereby a flag F6 is set. When the output of the nand gate NAND1 is "1", the output of the and gate AND2 corresponds to the state of the flag F2. Accordingly, under the set state of the flag F6 set by the "1" output of the NAND1, with Y2≦a2C2 and the set state of flag F2, the output of the and gate AND2 becomes "1", thereby the output of the or gate OR1 will be "1". On the other hand, with Y2>a2C2 and the reset state of the flag F2, the output of the and gate AND2 is kept "0". Thus, the operation in the step S15 can be performed.

In a case where both of the flags F1 and F5 are set and the output of the and gate AND1 is "1", the output of the and gate AND3 corresponds to the output of the flag F15, which is set when the minimum comparison data can not be obtained even if the outputs of the first block I, the second block II and the third block III of the standard photo sensor array 14 are used. In other words, the set state of the flag F15 represents that the previous focus detection was made under undesired condition. When the output of the and gate AND1 is "1", with the set state of the flag F15, the output of the and gate AND3 is "1", while with the reset state of the flag F15, the output of the and gate AND3 is "0". The and gate AND3 acts as the judgement in the step S17.

Referring to FIG. 5(a) again, in a case where the output of the and gate AND1 is "1" with "1" of the flag F15, the output of the and gate AND3 is "1" and the output of an inverter INV1 is "0", whereby the and gate AND4 is disabled. With "1" output of the and gate AND4, the output of the and gate AND5 corresponds to the state of the flag F3. With the set state of the flag F3, the output of the and gate AND5 becomes "1", causing the output of the or gate OR1 to be "1". If the flag F3 is not set, the output of the and gate AND5 is "0". The and gate AND5 acts as the operation of the step S18.

With "1" output of the and gate AND1 without the flag F15 set, the output of the and gate AND3 is "0" causing the output of the inverter INV1 to be "1". Accordingly, with the set state of the flag F4, the output of the and gate AND4 is "1", causing the output of the or gate OR1 to be "1". In a case where the flag F4 is not set, the output of the and gate AND4 is "0". The and gate AND4 acts as the operation of the step S19.

The focus detecting operation is described with reference to the flow chart of FIG. 6. If it is detected that the brightness or contrast of the photographic object is not suitable in the steps S13 or S14, the program flow goes to the steps S15 and S16 wherein the flag F5 is set and the minimum peak value Y2 is compared with the first judge level a2C2 which is most severe. If the minimum peak Y2 is smaller than a2C2, the minimum comparison data H2(n) calculated in the circuit arrangement A is used for the defocus detection. If the minimum peak Y2 is greater than a2C2, the program flow goes to the procedure for the focus detection using the output of the first block I of the photo sensor array 14. If it is detected in the steps S13 and S14 that the brightness and contrast of the photographic object is suitable, the program flow goes to the step S17 for judging whether or not the previous focus detection was suitable. If it is judged that the previous detection was suitable, the program flow goes to the step S19 and the minimum peak Y2 is compared with the third judge level which is loosest. If the previous focus detection was not suitable the program flow goes to the step S18 for comparison of the minimum peak with the second judge level a3C2. If it is judged that Y2 is equal to or smaller than a4C2 in the step S19 or Y2 is equal to or smaller than a3C2 in the step S18, the minimum comparison data H2(n) calculated in the circuit arrangement A is used for the defocus detection. If it is judged that Y2 is greater than a4C2 in the step S19 or Y2 is greater than a3C2, the program flow goes to the procedure for the focus detection using the output of the first block I of the standard photo sensor array 14.

Step S20 is provided for counting a predetermined period of time t0. In the preferred embodiment of the present invention, the focus detection is made first using the second block II of the standard photo sensor array 14, whereby if the result of the detection is not a reliable one, the focus detection is made a second time using the first block I of the standard photo sensor array 14. If the result of the detection using the first block I is not still a reliable one, the focus detection is made third using the third block III. In order to spend an equal time length for the focus detection using only the second group II, for the focus detection using the second and the first group II and I and for the focus detection using all three groups II, I and III, the step S20 is provided. Details of the operation of the step S20 and the focus detection will be explained later.

A terminal T1 in FIG. 5(a) is connected with a focus detection circuit B for the focus detection using the first group I of the standard photo sensor array 14 and a focus detection circuit C for the focus detection using the third block III, whereby the photo cell signals necessary for each block are transferred.

Output terminals T2, T3 and T5 are connected to an instruction circuit CPU. Output terminal T4 is connected with the circuit block B and C in which the judge levels for the minimum peak values Y1 and Y3 are determined.

Figure 11:
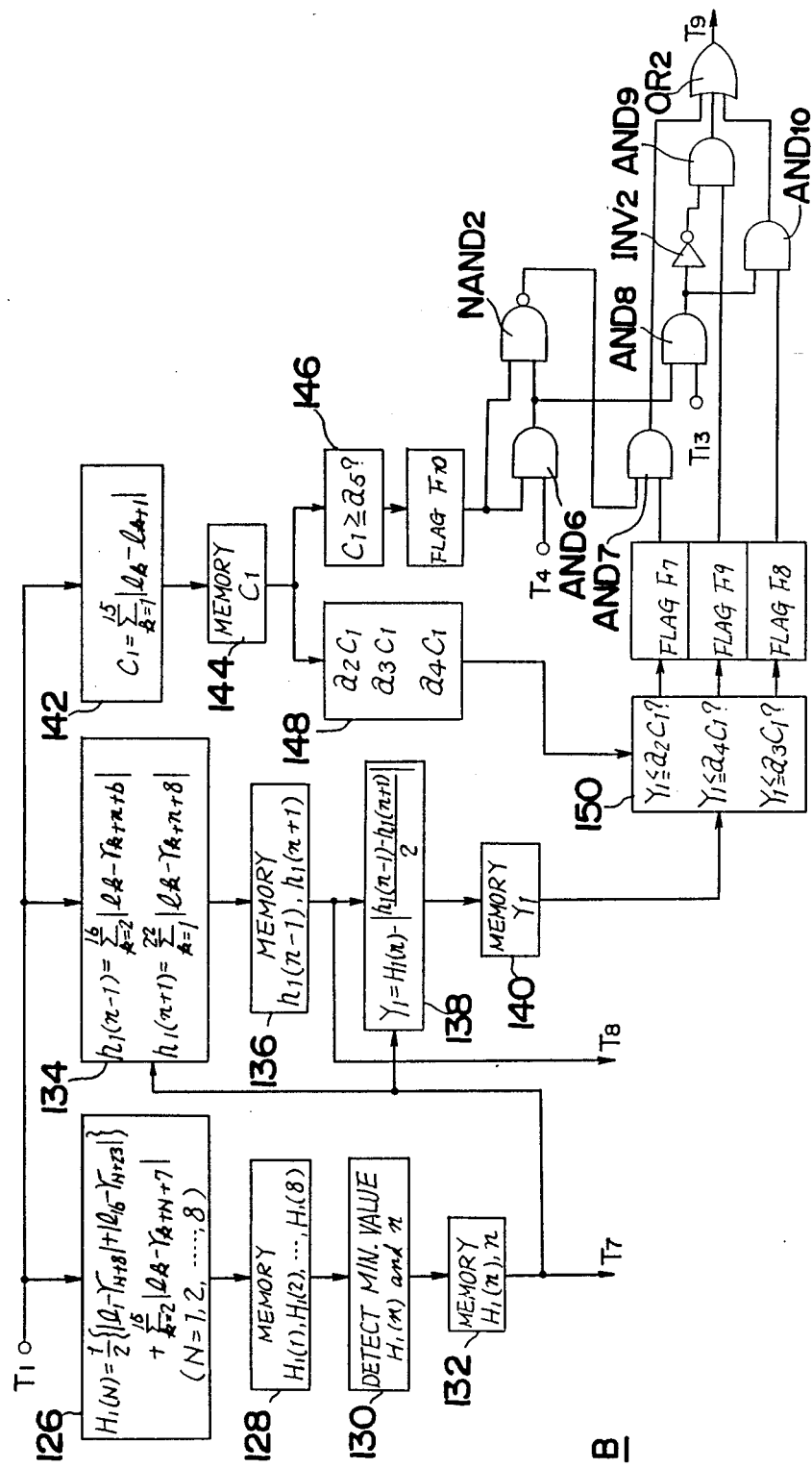

FIG. 11 shows the detail of the focus detection circuit B for the focus detection using the first block I of the standard photo sensor array 14. The focus detection circuit B can operate only when the minimum comparison data H2(n) can not be obtained using the second block II in the circuit A shown in FIG. 5. In other words, the circuit B is operated by the instruction fed from the instruction circuit CPU when the minimum peak value Y2 is not suitable and the output of the or gate OR1 is "0".

Referring to FIG. 11, an operation circuit 126 calculates the following equation.

$$H_1(N) = \tfrac{1}{2}\{|l_1 - r_{N+8}| + |l_{16} - r_{N+28}|\} + \sum_{k=2}^{15} |l_k - r_{k+N+7}| \tag{24}$$

Wherein the suffix 1 means the first block I is used and $N = 1, 2, \ldots 8$.

The circuit block B acts to detect the co-relation between the outputs of the first block I of the standard photo sensor array 14 and the outputs of the photo cells situated to the right to photo cell r9 of the reference photo sensor array 16 for detection of the rear focus condition.

Each comparison data $H_1(N)$ calculated by the circuit B is stored in a memory circuit 128 together with the shift value N. The minimum comparison data $H_1(n)$ among the eight comparison data thus calculated is stored in a memory circuit 132 as shown in the step S22 in FIG. 12.

Subsequently, the following equation is calculated in a calculation circuit 134 for detection of the image interval with an accuracy finer than the pitch of a pair of two adjacent photo cells.

$$h_1(n - 1) = \sum_{k=2}^{16} |l_k - r_{k+n+6}| \tag{25}$$

$$h_1(n+1) = \sum_{k=1}^{22} |l_k - r_{k+n+8}| \quad (26)$$

The result of the calculations (25) and (26) is stored in a memory circuit 136. Using the result of the calculations as mentioned above, the minimum peak value Y1 for the first group I can be calculated in a calculation circuit 138.

The minimum peak value Y1 thus calculated is stored in a memory circuit 140 in the steps S23 and S24. The circuit arrangement of the elements 126 through 140 shown in FIG. 11 is similar to the circuit arrangement formed by the elements 26 through 40 in FIG. 5(a) and the operation steps S21 through S24 shown in FIG. 12 correspond to the steps S8 through S11 in FIG. 6.

A contrast detection circuit 124 operates to calculate the following equation (27) similar to the contrast detection circuit 42 in FIG. 5(a) for detection of the contrast of the photographic object.

$$C_1 = \sum_{k=1}^{15} |l_k - l_{k+1}| \quad (27)$$

The result of the equation (27) represents the sum of the absolute value of each difference between the respective two adjacent photo cells. The contrast data C1 calculated by the equation 27 is stored in a memory circuit 144. The contrast data C1 is fed to a calculation circuit 148 in which each contrast data is multiplied with the constants a2, a3 and a4 respectively so as to decide the judge levels a2C1, a3C1 and a4C1 for the minimum comparison data Y1 in a similar manner as described with reference to the calculation circuit 48 shown in FIG. 5(a). The judge levels a2C1, a3C1 and a4C1 are fed to a comparison circuit 150 for comparing with the minimum peak value Y1. In case of Y1≧a2C1, a flag F7 is set, in case of Y1≧a3C1, a flag F8 is set and in case of Y1≧a4C1, a flag F9 is set.

Figure 12:
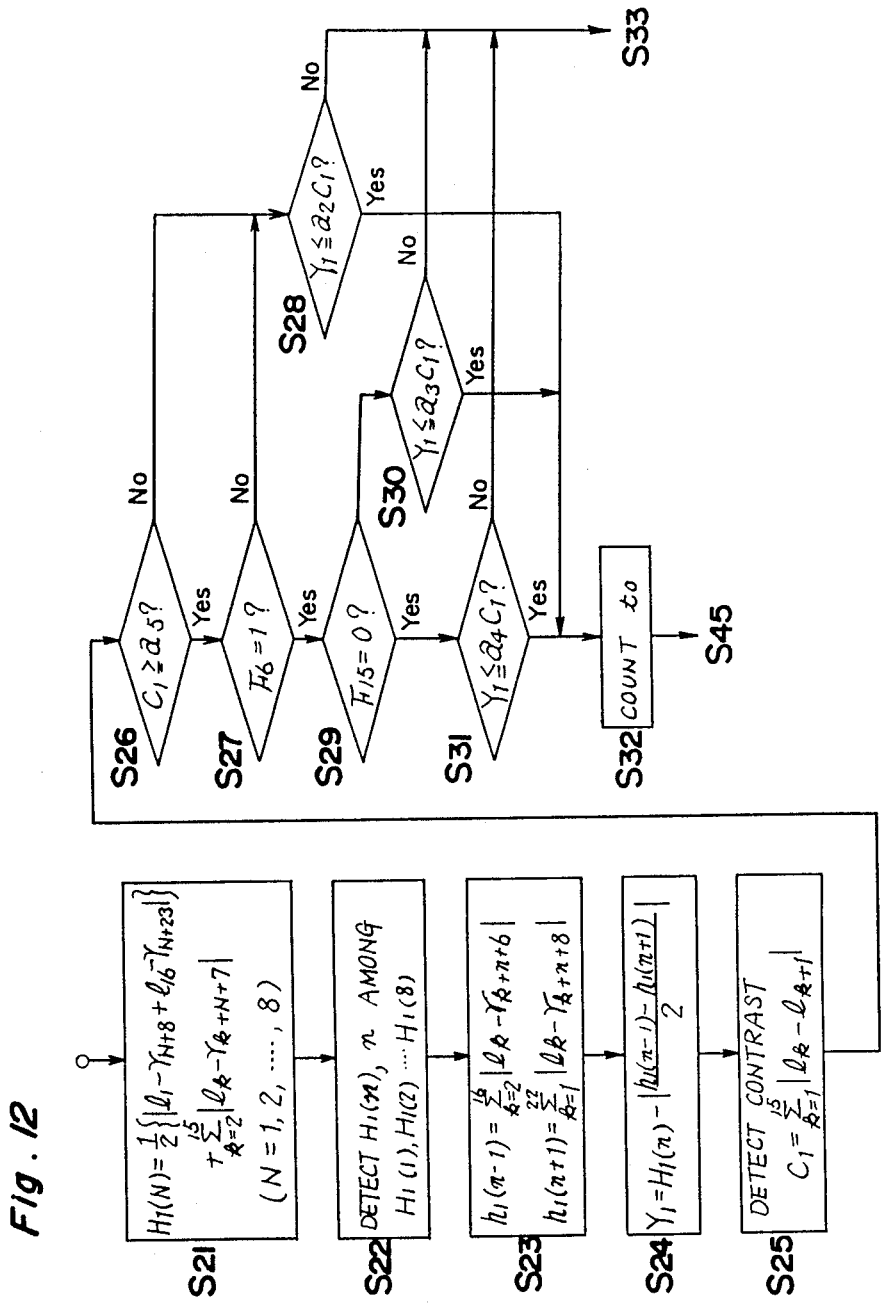

The contrast data C1 is fed to a comparator 146 for comparing with the constant a5 in a similar manner as performed in the comparator 46 shown in FIG. 5(a), whereby in case of C1≧a5, a flag F10 is set in the step S26 in FIG. 12.

In place of using the constant a5, another constant $a5' = 15/22 \times a5$ which is the multiplication of the value a5 with the ratio of the number of photo cells of the second block II and the first block I may be used.

The circuit arrangement shown in the right lower half portion of FIG. 11 is provided for executing the operation of the steps S27 through S31 in FIG. 12. In a case where the flag F10 is not set with the content thereof to be "0", or the flag F10 is set to "1" with the flag F6 connected to the terminal T4 to be "0", an output of an and gate AND6 is "0", so that the output of a nand gate NAND2 is "1". Accordingly if a flag F7 is "1", the output of an and gate AND7 is "1" and the output of an or gate OR2 is "1". If the flag F7 is "0", the output of the and gate AND7 is "0". The and gate AND6 performs the judgement of the step S27 and the and gate AND7 performs the judgement of the step S28. If both of the flags F6 and F10 are "1", the output of an and gate AND8 corresponds to the state of the flag F15 which is connected with a terminal T13. If the flag F15 is "1", the output of the and gate AND8 is "1" and an and gate AND10 is enabled with an and gate AND9 to be disabled. The output of the and gate AND10 corresponds to the state of the flag F6. Thus the and gate AND10 performs the judgement of the step S30. With "0" of the flag F15, the output of the and gate AND6 is "0", whereby an and gate AND9 is enabled by the output of an inverter INV7. Since the output of the and gate AND9 corresponds to the content of the flag F9, the and gate AND9 operates the step S31 in FIG. 12. An and gate AND8 acts to alternatively selectively enable any one of the and gates AND9 and AND10 in the step S28.

When the output of any one of the and gates AND7, AND9 and AND10 is "1", the output of the or gate OR2 is also "1", the the program flow goes to the step S32 to count the predetermined period of time t1 which is shorter than the time t0 in the step S20. The lengths of the times t0 and t1 are so defined as to spend an equal period of time for obtaining the suitable minimum comparison data H2(n) by using the steps S8 through S19 and for obtaining the suitable minimum comparison data H1(n) using from any one of the steps S16, S18, S19 to the step S31 through the step S21 and for obtaining the suitable minimum comparison data H3(n) by using the steps S43.

Output terminals T7 and T8 are respectively connected with the instruction circuit CPU so as to transfer the data H1(n), n, h1(n−1) and h1(n+1) to the circuit CPU. An output terminal T9 is also connected with the instruction circuit CPU. With a signal "1" of the terminal T9, the data transferred through the terminals T7 and T8 are employed for the image interval calculation. With the signal "0" of the terminal T9, the circuit C is enabled so as to executing the focus detection using the third block III.

The circuit C is used when there can not be obtained the reliable result of H2(n) and H1(n) by the operation of the circuit A using the second block II and the first block I. In other words, the circuit C is enabled according to the instruction fed from the instruction circuit CPU only when it is judged that the minimum peak Y1 is not suitable.

Figure 13:
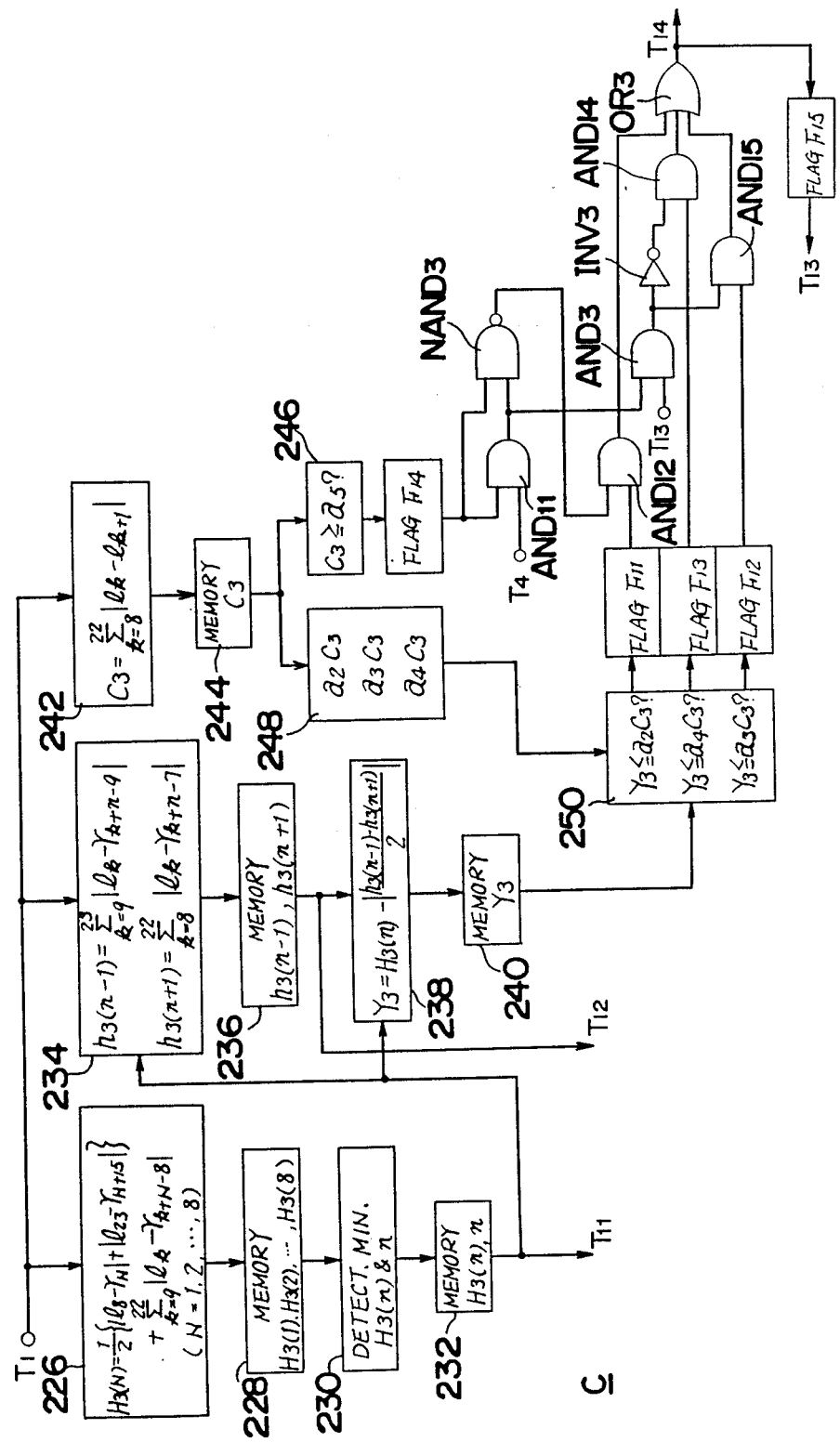

In FIG. 13, a calculation circuit 226 corresponds to the operation of the calculation circuit 26 of the circuit arrangement A, calculating the following equation in the step S33.

$$H_3(N) = \tfrac{1}{2}\{|l_8 - r_N| + |l_{23} - r_{N+15}|\} + \sum_{k=1}^{22} |l_k - r_{k+N-8}| \quad (28)$$

The suffix 3 in H3(N) means that the third block III is used and N=1, 2, 3, ... 8. Thus, the circuit C calculates the co-relation of the output of the third block III and the output of the photo cells left to the photo cell r23. In other words, the focus detection using the third block III is made under such case that the image interval is narrower than such case that the focus occurs on the predetermined focused plane, i.e., the detection using the third block III is made of the front focus condition.

Each data H3(N) calculated in the calculation circuit 226 is stored in the memory circuit 228 with the shift value N similar to the operation performed in the circuit A, the minimum data H3(n) among the eight comparison data can be detected by a minimum value detection circuit 230, in turn the minimum data H3(n) is stored in a memory circuit 232 with the minimum shift value n in the step S34.

The following equations are calculated by a calculation circuit 234 for detecting the image interval with a finer accuracy.

$$h_3(n-1) = \sum_{k=9}^{23} |l_k - r_{k+n-9}| \quad (29)$$

$$h_3(n+1) = \sum_{k=8}^{22} |l_k - r_{k+n-7}| \quad (30)$$

Using the data $h_3(n-1)$ and $h_3(n+1)$, the minimum peak value Y3 for the third block III is calculated in a calculation circuit 238. The minimum peak value Y3 is stored in a memory circuit 240 in the steps S35 and S36.

The circuit arrangement formed by elements 226 through 240 is similar to the arrangement formed by the elements 26 through 40 in the circuit shown in FIG. 5 and the operation thereof represented by the steps S33 through S36 corresponds to the operation shown in the steps S8 through S11.

A contrast detection circuit 242 calculates the following equation in a similar manner as operated in the contrast detection circuit 42 for obtaining the contrast value C3 in the step S37.

$$C3 = \sum_{k=8}^{22} |l_k - l_{k+1}| \quad (31)$$

The contrast value C3 represents the output difference between the two adjacent photo cells in the third block III of the standard photo sensor array 14. The calculated contrast value C3 is stored in a memory circuit 244.

The contrast data C3 is fed to a calculation circuit 248 in which each contrast data is multiplied with the constants a2, a3 and a4 respectively so as to decide the judge levels a2C3, a3C3 and a4C3 for the minimum comparison data Y3 in a similar manner as described with reference to the calculation circuit 48 shown in FIG. 5. The judge levels a2C3, a3C3 and a4C3 are fed to a comparison circuit 250 for comparing with the minimum peak value Y3. In case of $Y3 \leq a2C3$, a flag F11 is set, in case of $Y3 \leq a3C3$, a flag F12 is set and in case of $Y3 \leq a4C3$, a flag F13 is set.

The contrast value C3 is fed to a comparator 246 for comparing with the constant a5 in a similar manner as performed in the comparator 46 shown in FIG. 5, whereby in case of $C3 \geq a5$, a flag F14 is set in the step S38 in FIG. 14.

In place of using the constant a5, another constant $a5' = 15/22 \times a5$ which is the multiplication of the value a5 with the ratio of the number of photo cells of the second block II and the first block I may be used.

The circuit arrangement shown in the right lower half portion of FIG. 13 is provided for executing the operation of the steps S38 through S44 in FIG. 14. In a case where the flag F14 is not set with the content thereof to be "0", or the flag F14 is set to "1" with the flag F6 connected to the terminal T4 to be "0", an output of an and gate AND11 is "0", so that the output of a nand gate NAND3 is "1". Accordingly if a flag F11 is "1", the output of an and gate AND12 is "1" and the ouput of an or gate OR3 is "1". If the flag F11 is "0", the output of the and gate AND12 is "0". The and gate AND11 performs the judgement of the step S29 and the and gate AND12 performs the judgement of the step S40. If both of the flags F6 and F14 are "1", the output of an and gate AND13 corresponds to the state of the flag F15 which is connected with a terminal T17. If the flag F15 is "1", the ouput of the and gate AND13 is "1" and an and gate AND15 is enabled with an and gate AND14 disabled. The output of the and gate AND15 corresponds to the state of the flag F12. Thus the and gate AND15 performs the judgement of the step S42. With "0" of the flag F15, the output of the and gate AND13 is "0", whereby an and gate AND14 is enabled by the output of an inverter INV3. Since the output of the and gate AND14 corresponds to the content of the flag F17, the and gate AND14 operates the step S43 in FIG. 13. An and gate AND13 acts to alternatively selectively enable any one of the and gates AND14 and AND15 in the step S41 depending on the output of the flag F15.

When the output of any one of the and gates AND12, AND14 and AND15 is "1", the output of the or gate OR3 is also "1", the the program flow goes to the step S45.

In a case where the outputs of the and gates AND12, AND14 and AND15 are all "0", the output of the or gate OR3 is "0" and the flag F15 is set by the output of the inverter INV4. The flag F15 is set by "1" in a case where any reliable minimum comparison data is not obtained even if all of the circuits A, B and C are used, whereby the state of the flag F15 is used for selecting the severe judge level of the minimum peak value in the subsequent calculation operation.

It is noted that the steps for counting the period of time corresponding to the steps S20 in FIG. 6 and S32 in FIG. 12 are omitted in the operation shown in the steps S33 through S44 of the circuit C, because the respective periods of time for a first case in which the reliable minimum comparison data can be obtained by the operation performed by the steps S1 through S20, for a second case in which the reliable minimum comparison data can be obtained by the operation performed by the steps S1 through S32, for a third case in which the reliable minimum comparison data can be obtained by the operation performed by the steps S1 through S43 and for a fourth case in which the reliable minimum comparison data can not be obtained even if the operation is performed from the step S1 to the step S44 are defined by the same time length.

The advantage of equalizing the respective time lengths of the first case through third case as mentioned above is in that the period of time when the integration of the output of the CCD sensor array 14 or 16 is completed can be adjusted to the period of completion of the calculation of the minimum comparison data in the respective first through third cases.

Figure 15:
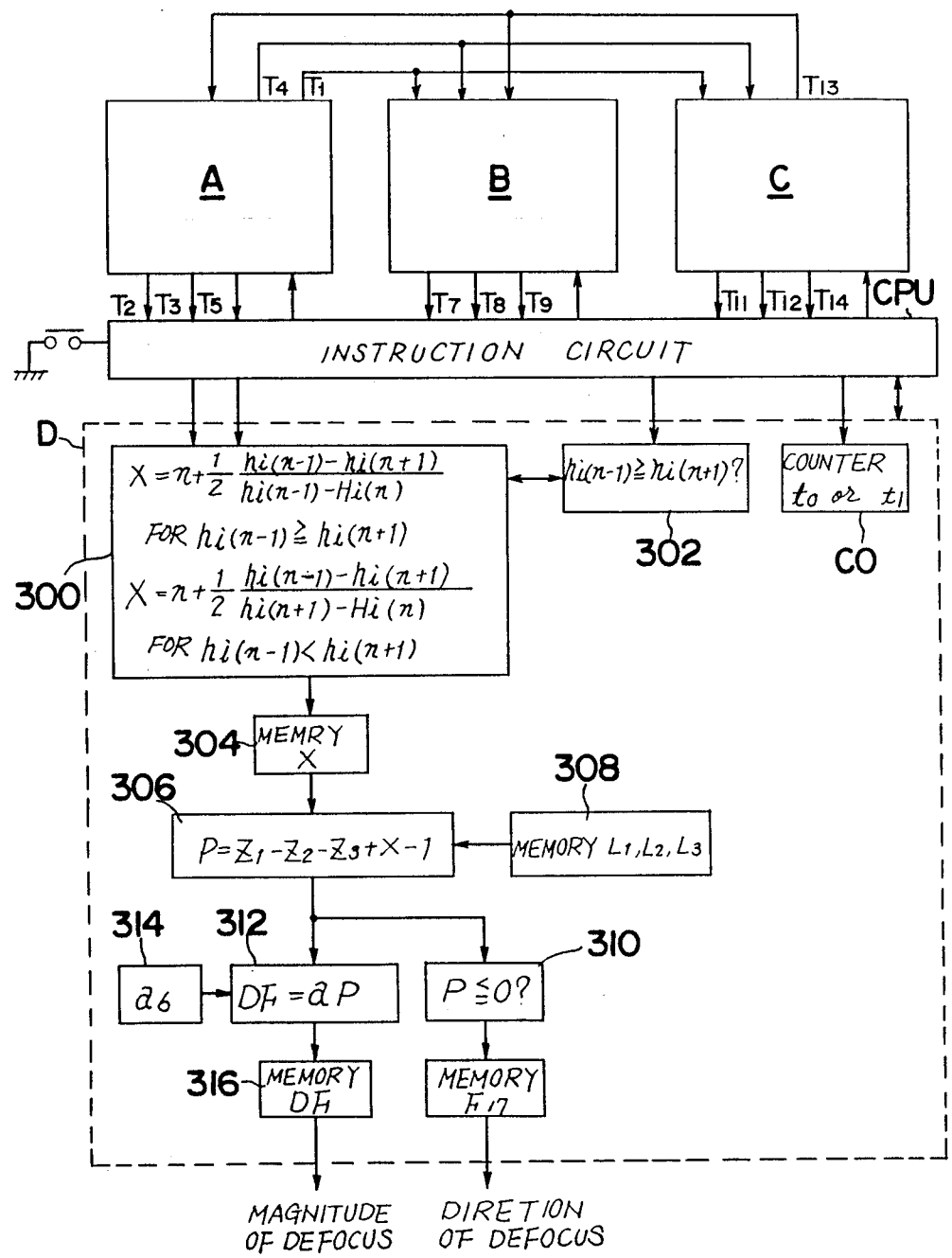

Terminals T11 and T12 in FIG. 13 are connected with the instruction circuit CPU in FIG. 15 so as to transfer the data $H_3(n)$, n, $h_3(n-1)$ and $h_3(n+1)$ to the instruction circuit CPU. A terminal T14 is also connected to the instruction circuit CPU, whereby with "1" of the signal on the terminal T14, data transferred from terminals for transferring the result of calculation of the image interval is taken in the instruction circuit CPU and with "0" of the signal on the terminal T14 another operation described later is performed.

A circuit arrangement D shown in FIG. 15 is provided for controlling the circuits A, B and C and for calculating the amount of the defocus of the photographic lens and the direction of the defocus on the basis of the minimum comparison data $H_2(n)$, $H_1(n)$ and $H_3(n)$ and the minimum shift value n. The instruction circuit CPU receives the minimum comparison data $H_2(n)$ and the minimum shift value n from the circuit A through the terminals T2 and T3 and the signal representing whether the minimum comparison data $H_2(n)$ is reliable through the terminal T5. The instruction circuit CPU transfers the data $H_2(n)$ to a calculation circuit 300 as $H_i(n)$ when the terminal T5 is "1" which means the minimum comparison data $H_2(n)$ is reliable. With "1" of the terminal T5, the data $h_2(n-1)$ and $h_2(n+1)$ are transferred to the calculation circuit 300 and a comparator 302 from the instruction circuit CPU. Furthermore, with "1" on the terminal T5, the instruction circuit CPU enables a counter CO to count the time t0 for operation of the procedure of the step S20.

"1" of the terminals T9 and T14 of the circuits B and C represents which of the minimum comparison data $H_1(n)$ or $H_3(n)$ is reliable. In a case where the terminals T9 or T14 is "1", the reliable minimum comparison data $H_1(n)$ or $H_3(n)$ is input to the calculation circuit 300 from the instruction circuit CPU, enabling the counter CO for counting the time t1 so as to operating the procedure of the step S22.

As mentioned above, the instruction circuit CPU inputs the reliable minimum comparison data $H_i(n)$ to the calculation circuit 300. Furthermore, the data $h_i(n-1)$ and $h_i(n+1)$ corresponding to the data $H_i(n)$ (i=1, 2 or 3) are input to the comparator 302 and the calculation circuit 300. The comparator 302 compares the two data $h_i(n-1)$ and $h_i(n+1)$ and the result of the comparison is fed to the calculation circuit 300 as shown in the step S45 in FIG. 14.

The calculation circuit 300 calculates any one of the following equations (32) and (33) depending on the result of the comparison for calculating the interpolation shift value X.

$$h_i(n-1) \geq h_i(n+1)$$

$$X = n + \left\{ \frac{1}{2} \frac{h_i(n-1) - h_i(n+1)}{h_i(n-1) - H_i(n)} \right\} \quad (32)$$

$$h_i(n-1) < h_i(n+1)$$

$$X = n + \left\{ \frac{1}{2} \frac{h_i(n-1) - h_i(n+1)}{h_i(n+1) H_i(n)} \right\} \quad (33)$$

The shift value X thus obtained represents the minimum interpolation shift value that is the minimum shift value finer than the pitch between the two adjacent photo cells.

FIG. 16(a) is a graph showing the shift value taken on the horizontal axis vs the comparison data taken on the vertical axis in case of $h_i(n-1) \geq h_i(n+1)$. In order to obtain the shift value with the highest coincidence between n−1 and n or n and n+1, a gradient of a line f1 in the intermediate position Q1 between n−1 and n is considered. f1 is a line connecting the point $h_i(n-1)$ and the point $H_i(n)$. The gradient is expressed by $H_i(n) - h_i(n-1)$. A gradient at the intermediate point Q2 of a line f2 connecting points Hi(n) and hi(n+1) is $hi(n+1) - Hi(n)$. FIG. 16(b) shows the both gradients by the points V1 and V2. A line f3 connecting the points V1 and V2 is depicted and a point V3 is a cross point of the line f3 with the horizontal axis. The shift value up to the point V3 is defined as the minimum interpolation shift value X. The minimum interpolation shift value X can be obtained by the equations (32) or (33) selected depending on the relation of the magnitude of hi(n−1) and hi(n+1). The minimum interpolation shift value X is stored in a memory circuit 304. A displace value P between the image on the standard photo sensor array 14 and the image on the reference photo sensor array 16 is calculated in the calculation circuit 306 by the following equation (34) using the minimum interpolation shift value X.

$$P = Z1 - Z2 - Z3 + X - 1 \quad (34)$$

Figure 17:
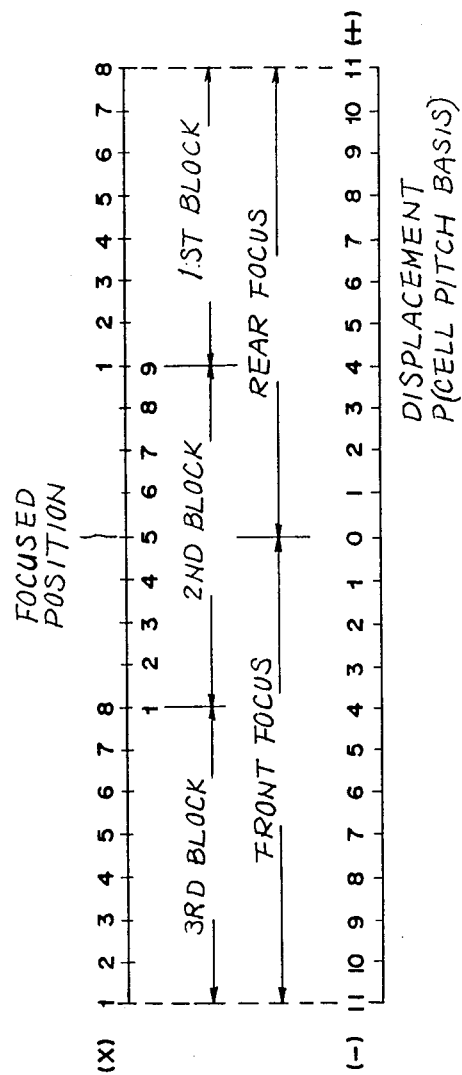
FIG. 17 is a schematic diagram showing the number a lines of the shift value and displacement.

In the equation (34), Z1 is a length L1 between the photo cell l1 and the photo cell r1, Z2 is the image interval L2 which is the length between the photo cells l12 and r16 in case of the in-focus condition and Z3 is a constant which is defined depending on which minimum comparison data for the first block through third block is used. In the preferred embodiment, Z1=4, Z2=8 and Z3 is −8 in a case where the first block I is used, 0 in a case where the second block II is used and 7 in a case where the third block III is used. By defining Z1 though Z3 as mentioned above, P is 0 in case of the in-focus condition, P is smaller than 0 in case of the front focus condition and P is greater than 0 in case of the rear focus condition. Thus, the displacement P can be obtained by the minimum interpolation shift value X. FIG. 17 shows the relation between the minimum interpolation shift value X and the displacement X. The upper number line in FIG. 17 represents the minimum interplation shift values in the respective blocks I, II and III and the lower number line represents the displacement values P in the element to element pitch basis. For example, in a case where minimum interpolation value X is 5 for the second block II, P=4−3−0+5−1=0 which shows the in-focus condition. In a case where the minimum interpolation value X is 6 for the first block I, $$P = 4 - 3 + 8 + 6 - 1 = 9$$

and in a case where X is 4 for the third block III, $$P = 4 - 8 - 7 + 4 - 1 = 8,$$

whereby the front focus condition or rear focus condition can be detected.

The values Z1 through Z3 are stored in a memory circuit 308 shown in FIG. 15, from which the values Z1 and Z2 are read out and fed to a calculation circuit 306 with the value Z3 selected by the instruction circuit CPU corresponding to which blocks I to III is used for obtaining the minimum comparison data Hi(n).

The displacement value P thus calculated is input to a comparator in which the sign of + and − of the displacement value is detected in the step S49 shown in FIG. 14. In case of $P \leq 0$, a flag F17 is set to "1" in the step S50. In case of P>0, the flag F17 is "0". The content of the flag F17 represents the direction of the defocus with reference to the predetermined focal plane, so that if the in-focus condition or front focus condition is detected the flag F17 is "1" and when the rear focus condition is detected, the flag F17 is "0" The signal of the flag F17 is fed to a motor drive circuit 420 shown in FIG. 18 for driving a lens motor to control the direction of rotation of the lens motor.

The calculated displacement value P is fed to a defocus calculation circuit 312 shown in FIG. 15 in which the value P is multiplied with a constant a6 stored in the memory circuit 314, whereby the defocus value DF can be obtained. The constant a6 is defined for converting the displacement value P of the two images projected on the photo sensor arrays 14 and 16, which are placed to extend in a vertical direction against the optical axis into the defocus value on the predetermined focal plane in the optical axis. The constant a6 can be defined depending on the distance between the photo sensor arrays 14, 16 and the predetermined focal plane, the magnification ratio of the condenser lens and reimage forming lenses. The defocus value DF thus calculated is stored in a memory circuit 316, and the stored defocus value DF is fed to the motor drive circuit 420 for controlling the rotating amount of the lens motor.

The focus detecting device of the preferred embodiment is so arrange that the standard photo sensor array 14 is divided into three blocks and the focus detection is performed using the second block II for the focus detection near the in-focus position with the priority, then if the focus detection is not suitable or impossible using the second block II, the other blocks I or III are used for the focus detection. Accordingly, the circuit arrangement is simple compared with the conventional device in which the focus detecting is made for the various blocks then it is judged which focus detection is most suitable. Furthermore according to the present invention, it is able to detect the in-focus condition in case of the photographic object has a repetitively pattern having a predetermined relation with the pitch of adjacent two photo cells. Furthermore, if the focus detection using the second block is impossible the first block I or third block III is used, and means for judging whether or not the result of the focus detection is correct can be omitted.

Figure 18:
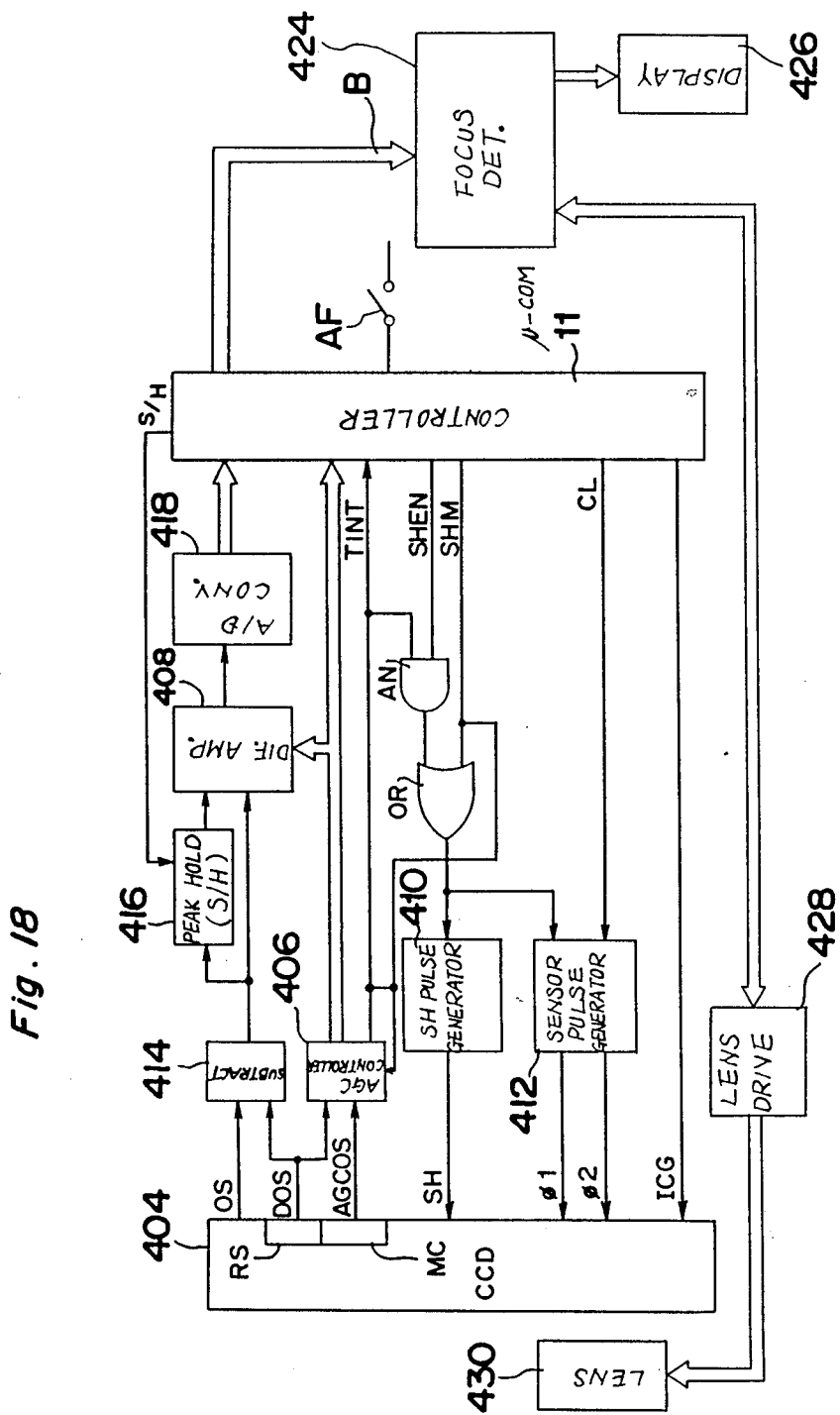
FIG. 18 is a block diagram of an automatic focus control circuit used in the embodiment of the present invention.

FIG. 18 shows one example of the circuit arrangement in which a micro computer is used for calculation of the focus condition as described above. Referring to FIG. 18, when a pressure of a shutter release button of a camera is detected by a microcomputer μ-com, an AF switch AF is closed for starting the focus control. A pulse like clear signal ICG for clearing the result of integration is fed to CCD photo sensor arrays 404, the contents of the photo cells of the CCD photo sensor arrays are reset and the output AGCOS of a brightness monitor circuit MC can be recovered to the power source voltage level. Also the microcomputer μ-com produces signal SHEN of a high level for allowing the production of shift pulses SH. When the clear signal ICG for clearing the integration diminishes, the CCD 404 starts the integration of the photo current in the CCD and the output of the brightness monitor circuit MC begins to decrease with a speed depending on the brightness of the object while the standard signal DOS from a standard signal generator RS is kept to a constant standard level. An AGCO controller 406 compares the signal AGCOS with the standard signal DOS to control the gain of a differential amplifier 408 depending on degree of the output of the AGCOS decreases against the signal DOS during a predetermined time length. After the integration clear signal ICG is diminished, when the AGC controller 406 detects that the signal AGCOS is decreased lower than a predetermined level relative to the value of the signal DOS within the predetermined time length, the AGC controller 406 produces a signal TINT of high level. The signal TINT is fed to a shift pulse generator 410 through an and gate AN and an or gate OR, whereby the shift pulse generator 410 provides a shift pulse SH. When the shift pulse SH is input to the CCD 404, the integration of the respective photo cells is finished and the charge corresponding to the intergrated value is transferred to a shift register of the CCD 404 corresponding to each of the photo cells in a parallel manner. On the other hand two sensor drive pulse trains φ1 and φ2 with an output of phase of 180° are fed to the CCD 404 from a sensor drive pulse generator 412 based on the clock pulses from the microcomputer μ-com. The CCD 404 outputs the charges in the respective cell of the CCD shift register one by one from one end in synchronism with the positive edge of the pulses φ1 so as to produce the voltage OS which forms the video signal. It is noted the higher the voltage OS, the lower the intensity of light projected to the photo cells. The voltage OS is subtracted by the standard voltage DOS, thereby outputting the photo cell signal (DOS-OS).

If a predetermined time is lapsed without outputting the signal TINT after the integration clear signal ICG is diminished, the microcomputer μ-com generates an instruction signal SHM for generation of the shift pulse SH. Accordingly, when the signal TINT is not generated from the AGC controller 406 after the predetermined time is lapsed from the period when the clear signal ICG is diminished, the shift pulse generator 410 generates a shift pulse SH.

On the other hand, when the outputs from the seventh to tenth photo cells are produced, the microcomputor generates a sample hold signal S/H, whereby a peak hold circuit 416 holds the difference between the signal OS of the part of the photo cells covered by an alminium mask and the signal DOS and thereafter the difference signal and the photo cell signals are input to the differential amplifier 408. The difference between the photo cell signal and the difference signal is amplified with the gain controlled by the AGC controller 406 and then the output of the differential amplifier is digitized by the A/D converter 418 and the digitized data is fed to the microcomputer μ-com.

By depression of the shutter release button by one step, the clear signal ICG for clearing the integration is generated and at the time when the clear signal ICG is diminished, the integration of the photo cells of the CCD arrays begin, the maximum time of the microcomputor μ-com for this integration is 100 msec. If the brightness of the object is higher than a predetermined level, the signal AGCOS decreases by 2.8 volt against the signal DOS until 100 msec are lapsed, so that the microcomputer μ-com generates the signal TINT and the gain control signal for controlling the gain of the differential amplifier 408.

If the brightness of the object is lower than the predetermined level, the signal AGCOS is not decreased against the signal DOS by more than 2.8 volts during 100 msec after the signal ICG is diminished, then the micorcomputer —com generates the signal SHM at the time when 100 msec is lapsed and the gain control signal is generated from the AGC controller 406. In this case the AGC controller 406 judges that the integration times 100 to 200 msec, 200 to 400 msec, 400 to 800 msec or more than 800 msec is necessary depending on the degree of decrement of the signal AGCOS within 100 msec. Then the AGC controller 406 provides a gain setting signal to set the gain of the differential amplifier 408 in any one of the gains 1, 2, 4 and 8. In this case the signal TINT is not generated.

The video signals are fed to the microcomputer μ-com from the A/D converter 418 and the focus detection circuit 424 stores the respective video signals and defocus value and direction is calculated in the circuit 424 in a manner described above for controlling the focused condition of the photographic lens 430.

In place of taking the outputs of each of the photo cells l1 through l23 and r1 through r31, a subtraction of the output of the photo cell 11 by the output of the photo cell 15 may be used as the output of the photo cell 13, similarly a subtraction of the output of the photo cell 12 by the output of the photo cell 16 may be used as the output of the photo cell 14. In general the subtraction of the output of one photo cell by another output of a photo cell apart from a suitable number of the photo cell may be used as the output of the photo cell situated at the center between the one photo cell and another photo cell. Using this method, the high frequency component of the image can be eliminated.

FIG. 5(b) shows the circuit arrangement for processing the signals as described above. The output signals S1 of the A/D converter 20 are applied to a subtract circuit S' in which the signals S1 fed from the A/D converter 20 are partly fed to a subtract circuit and partly to a delay circuit. The delay circuit acts to delay the signals S1 by a time length corresponding to the time necessary for transferring the signal by four photo cells of the photo sensor array 14, then outputs the signal S2. By this arrangement, the subtract circuit subtracts the signals S1–S2. The output signal of the subtract circuit represents the difference between the output of one photo cell (for example photo cell 11) and another output of a photo cell apart by four cells (four example the photo cell 15). Thus the output of the subtract circuit represents the difference of the output signals of the photo cells 11 and 15. A similar operation can be performed for the respective photo cells.

What is claimed is:

1. A focus detection system for detecting the focus condition of an objective lens comprising:
   dividing means for dividing a predetermined detectable range of an amount of defocus of the objective lens into a plurality of divided ranges;
   selecting means for selecting one of the divided ranges;
   discriminating means for discriminating whether the amount of defocus can be detected within the selected range, and
   calculating means for calculating the amount of defocus within the selected range when the discriminating means discriminates that the amount of defocus can be detected within the selected range, and for calculating the amount of defocus within the divided range other than the selected range when the discriminating means discriminates that the amount of defocus cannot be detected within the selected range.

2. The focus detection system as claimed in claim 1, wherein said dividing means includes means for dividing the predetermined detectable range into three divided ranges including a first range containing a present infocus position, a second range determined in a front-focus side of the first range and a third range determined in a rear-focus side of the first range, and wherein said selecting means selects the first range.

* * * * *